United States Patent
Yang et al.

(10) Patent No.: US 11,639,457 B2
(45) Date of Patent: May 2, 2023

(54) HEAT TRANSFER FLUIDS AND METHODS FOR PREVENTING CORROSION IN HEAT TRANSFER SYSTEMS

(71) Applicant: PRESTONE PRODUCTS CORPORATION, Danbury, CT (US)

(72) Inventors: Bo Yang, Ridgefield, CT (US); Peter M. Woyciesjes, Danbury, CT (US)

(73) Assignee: PRESTONE PRODUCTS CORPORATION, Danbury, CT (US)

( * ) Notice: Subject to any disclaimer, the term of this patent is extended or adjusted under 35 U.S.C. 154(b) by 0 days.

(21) Appl. No.: 16/317,146

(22) PCT Filed: Jul. 12, 2017

(86) PCT No.: PCT/US2017/041627
§ 371 (c)(1),
(2) Date: Jan. 11, 2019

(87) PCT Pub. No.: WO2018/013630
PCT Pub. Date: Jan. 18, 2018

(65) Prior Publication Data
US 2019/0225855 A1 Jul. 25, 2019

Related U.S. Application Data

(60) Provisional application No. 62/361,235, filed on Jul. 12, 2016.

(51) Int. Cl.
*C09K 5/20* (2006.01)
*C09K 5/10* (2006.01)
*C23F 11/18* (2006.01)
*C23F 11/08* (2006.01)

(52) U.S. Cl.
CPC .......... *C09K 5/20* (2013.01); *C09K 5/10* (2013.01); *C23F 11/08* (2013.01); *C23F 11/185* (2013.01); *C23F 11/187* (2013.01); *C23F 11/188* (2013.01)

(58) Field of Classification Search
CPC .............. C09K 5/00; C09K 5/14; C09K 5/20
USPC ........................................................ 252/75
See application file for complete search history.

(56) References Cited

U.S. PATENT DOCUMENTS

| | | | | |
|---|---|---|---|---|
| 3,282,846 A * | 11/1966 | Scott | | C09K 5/20 252/75 |
| 3,931,029 A * | 1/1976 | Dutton | | C09K 5/20 252/76 |
| 4,613,445 A * | 9/1986 | Haack | | C09K 5/20 252/180 |
| 4,704,220 A | 11/1987 | Goddard et al. | | |
| 5,073,283 A * | 12/1991 | Leung | | C09K 5/20 252/71 |
| 5,997,763 A * | 12/1999 | Pabon, Jr. | | C23F 11/124 252/76 |
| 6,203,719 B1 * | 3/2001 | Turcotte | | C09K 5/10 252/396 |
| 7,387,748 B2 | 6/2008 | Pellet et al. | | |
| 7,588,695 B2 | 9/2009 | Wenderoth et al. | | |
| 8,613,866 B1 * | 12/2013 | Yang | | C23F 11/08 252/73 |
| 8,617,416 B1 * | 12/2013 | Yang | | C23F 11/08 252/73 |
| 10,017,678 B2 | 7/2018 | Yang et al. | | |
| 2003/0164470 A1 * | 9/2003 | Wenderoth | | C09K 5/20 252/71 |
| 2006/0131544 A1 | 6/2006 | Scholer | | |
| 2009/0060131 A1 | 3/2009 | Yokozawa | | |
| 2010/0116473 A1 | 5/2010 | Yang | | |
| 2014/0070134 A1 | 3/2014 | Woyciesjes et al. | | |
| 2016/0017200 A1 | 1/2016 | Yang et al. | | |

FOREIGN PATENT DOCUMENTS

| | | |
|---|---|---|
| CN | 1780894 | 5/2006 |
| CN | 104559945 | 4/2015 |
| CN | 104822795 | 8/2015 |
| CN | 105484322 | 4/2016 |
| JP | S61-502765 | 11/1986 |
| RU | 2360939 | 7/2009 |
| WO | WO 86/00919 | 2/1986 |
| WO | WO 98/03608 | 1/1998 |
| WO | WO 2020/028393 | 2/2020 |

OTHER PUBLICATIONS

PCT International Search Report for PCT/US2017/041627 dated Sep. 22, 2017.
PCT Written Opinion for PCT/US2017/041627 dated Sep. 22, 2017.
Supplementary Search Report issued in Appl. No. EP 17828346.1 (dated Mar. 10, 2020).
Office Action issued in Appl. No. CN201780055667.3 (dated Jul. 3, 2020).
Office Action issued in Appl. No. JP 2019-501584 (dated Nov. 16, 2020).
Office Action issued in Appl. No. RU2019103695 (dated Nov. 17, 2020).
Office Action issued in Appl. No. TW106123395 (dated Jan. 13, 2021).
Office Action issued in Appl. No. CN201780055667.3 (dated Jun. 3, 2021).
Office Action issued in Appl. No. JP2019 501584 (dated Sep. 21, 2021).

(Continued)

*Primary Examiner* — Jane L Stanley
(74) *Attorney, Agent, or Firm* — Barnes & Thornburg LLP; G. Peter Nichols

(57) ABSTRACT

Heat transfer fluid concentrates include: a freezing point depressant, water, or a combination thereof; an organophosphate; a carboxylic acid or a salt thereof; and a component selected from the group consisting of an alkaline earth metal ion, an alkali metal ion, a transition metal ion, an inorganic phosphate, molybdate ion, nitrate ion, nitrite ion, an azole compound, a copper and copper alloy corrosion inhibitor, a silicate, a silicate stabilizer, a water-soluble polymer, and combinations thereof. Ready-to-use heat transfer fluids and methods for preventing corrosion in heat transfer systems are described.

30 Claims, 1 Drawing Sheet

(56) References Cited

OTHER PUBLICATIONS

Office Action issued in Appl. No. RU2019103695 (dated Jul. 23, 2021).
English Translation of Office Action issued in Appl. No. KR 10-2019-7003229 (dated Apr. 28, 2022).
Examination Report issued in Appl. No. EP17828346.1 (dated Jun. 27, 2022).
English Translation of Second Office Action issued in Appl. No. KR 10-2019-7003229 (dated Jan. 1, 2023).

* cited by examiner

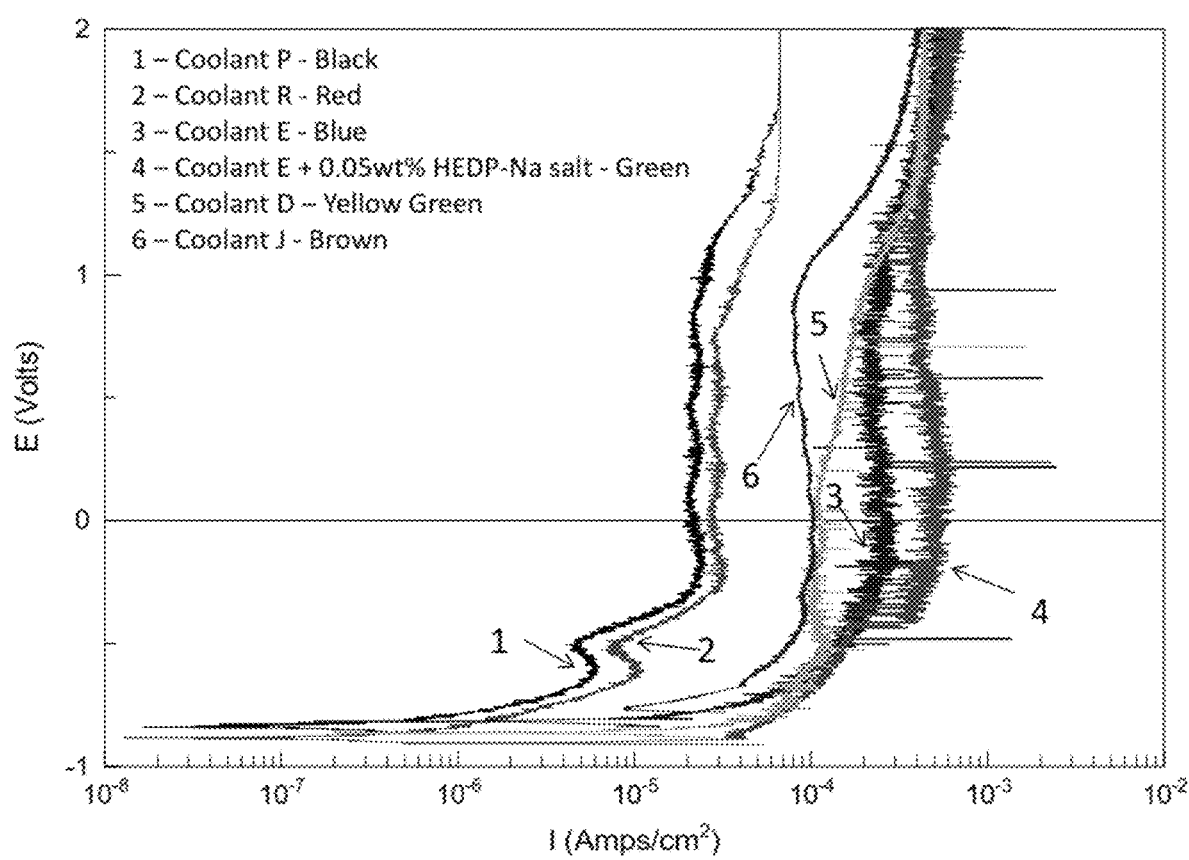

HEAT TRANSFER FLUIDS AND METHODS FOR PREVENTING CORROSION IN HEAT TRANSFER SYSTEMS

CROSS REFERENCE TO RELATED APPLICATIONS

This application is a U.S. nationalization under 35 U.S.C. § 371 of International Application No. PCT/US2017/041627, filed Jul. 12, 2017, which claims priority to U.S. Provisional Application No. 62/361,235 filed Jul. 12, 2016. The entire contents of both of these documents are incorporated herein by reference.

TECHNICAL FIELD

The present teachings relate generally to heat transfer fluids and, in some embodiments, to heat transfer fluids for inhibiting corrosion in heat transfer systems.

BACKGROUND

Modern vehicle engines generally require a heat transfer fluid (liquid coolant) to provide long-lasting, year-round protection of their cooling systems. The primary requirements of heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Aluminum corrosion protection for engine block, cylinder head, water pump, heat exchangers and other components made from aluminum or aluminum alloys is particularly important. Beyond metal protection, corrosion protection helps the heat transfer fluid to fulfill its primary function of transferring excess heat from the engine to the radiator for dissipation.

Common corrosion-related problems that may arise in automotive cooling systems include: (1) cavitation corrosion and rusting of cylinder heads and cylinder blocks; (2) seal leakage, bellows seal failure, and cavitation corrosion in water pumps; (3) solder bloom, scale and deposit formation, and pitting in radiators and heater cores; (4) thermostat sticking; and/or (5) crevice corrosion at hose necks. In addition, erosion-corrosion, galvanic corrosion, under-deposit corrosion, and/or stray-current corrosion may occur at susceptible locations in a cooling system depending on conditions.

Different kinds of metals may be used to fabricate the various parts of a cooling system. By way of example, cast iron and cast aluminum alloys may be used for cylinder blocks, cylinder heads, intake manifolds, coolant pumps, and power electronic device enclosures; wrought aluminum and copper alloys may be used for radiators and heater cores; solders may be used to join the components of brass or copper radiators or heater cores; steel may be used for cylinder head gaskets and for small components such as freeze plugs, coolant pump housing enclosures, and coolant pump impellers; and copper alloys may be used in thermostats.

Rapid depletion of key corrosion inhibitors (e.g., nitrite) in engine coolants, together with substantial increase in pH of coolant solutions, have been observed in the field and also confirmed in laboratory tests. Such changes to a coolant may negatively impact its corrosion protection performance and affect its stability. Test results demonstrate that such coolant changes are most pronounced after contact with the aluminum surfaces of heat exchangers manufactured by a controlled atmosphere brazing (CAB) technique under engine cooling system operating conditions. The potassium fluoroaluminate flux residue left on aluminum surfaces after the CAB process may play a key role in changing the chemical properties and protection performance of engine coolants. The development of lighter, more compact powertrains to improve fuel economy, and the increasing use of aluminum heat exchangers produced by the CAB technique in engine cooling systems to replace ones previously manufactured by other techniques (e.g., mechanical assembly or vacuum brazing) may contribute to the observed changes in engine coolants during field use.

Corrosion protection of components manufactured from aluminum or aluminum alloys (e.g., engine block, cylinder head, water pump, heat exchangers, and the like), corrosion protection of heat transfer system components produced by the CAB process (e.g., heat exchangers), and corrosion protection at high temperature (e.g., in cooling systems for vehicles equipped with exhaust gas recirculation or EGR) are of interest.

SUMMARY

The scope of the present invention is defined solely by the appended claims, and is not affected to any degree by the statements within this summary.

By way of introduction, a first heat transfer fluid concentrate in accordance with the present teachings includes (a) a freezing point depressant, water, or a combination thereof; (b) an organophosphate; (c) a carboxylic acid or a salt thereof; and (d) a component selected from the group consisting of an alkaline earth metal ion, an alkali metal ion, a transition metal ion, an inorganic phosphate, molybdate ion, nitrate ion, nitrite ion, an azole compound, a copper and copper alloy corrosion inhibitor, a silicate, a silicate stabilizer, a water-soluble polymer, and combinations thereof.

A second heat transfer fluid concentrate in accordance with the present teachings includes (a) a freezing point depressant, water, or a combination thereof, wherein the freezing point depressant is present in an amount ranging from about 1 wt. % to about 99% wt. % based on a total weight of the heat transfer fluid concentrate; (b) an organophosphate, wherein the organophosphate is present in an amount ranging from about 0.002 wt. % to about 5 wt. % based on the total weight of the heat transfer fluid concentrate; (c) a carboxylic acid or a salt thereof, wherein the carboxylic acid or the salt thereof is present in an amount ranging from about 1 wt. % to about 10 wt. % based on the total weight of the heat transfer fluid concentrate, wherein the carboxylic acid includes one or a plurality of $C_6$ to $C_{20}$ carboxylic acids, and wherein the one or the plurality of $C_6$ to $C_{20}$ carboxylic acids is individually selected from the group consisting of an aliphatic mono-carboxylic acid, an aliphatic di-carboxylic acid, an aromatic mono-carboxylic acid, an aromatic di-carboxylic acid, and combinations thereof; (d) calcium ion in a concentration up to about 200 mg/L based on a total weight of the heat transfer fluid concentrate; (e) magnesium ion in a concentration up to about 150 mg/L based on a total weight of the heat transfer fluid concentrate; (f) an azole compound present in an amount ranging from about 0.01 wt. % to about 3 wt. % based on the total weight of the heat transfer fluid concentrate; and (g) optionally, an additional component selected from the group consisting of an inorganic phosphate, lithium ion, zinc ion, nitrate ion, nitrite ion, molybdate ion, a phosphonate, a phosphinate, an acrylate-based polymer, a colorant, a biocide, an antifoam, a surfactant, a dispersant, an antiscalant, a wetting agent, and combinations thereof.

A ready-to-use heat transfer fluid in accordance with the present teachings includes water and a heat transfer fluid concentrate of a type described above. The heat transfer fluid concentrate is present in an amount ranging from about 30 vol. % to about 60 vol. % based on a total volume of the heat transfer fluid.

A method in accordance with the present teachings for preventing corrosion in a heat transfer system includes contacting at least a portion of the heat transfer system with a heat transfer fluid of a type described above.

BRIEF DESCRIPTION OF THE DRAWINGS

FIG. 1 shows the anodic polarization curve measurements obtained on an AA319 cast aluminum alloy electrode immersed in 25 vol. % coolant concentrate+100 ppm chloride ions for 6 hours under the heat rejection heat transfer conditions.

DETAILED DESCRIPTION

To ensure long service life and to fulfill design functions, metal components used in automotive cooling systems have to be protected from corrosion by an engine coolant. In addition, an engine coolant should be compatible with non-metals (such as hoses, gaskets and plastics) used in cooling systems. Excessive corrosion or degradation of material used in cooling systems may lead to a substantial reduction in the strength of a material or component, loss of coolant from the system, and subsequent malfunction of one or more of the cooling system components. All of these events may result in engine failure. Furthermore, even relatively mild corrosion may result in formation of corrosion products that may form scales or deposits on heat transfer surfaces. These scales or deposits may greatly reduce heat transfer rate. The thermal conductivity for a nonporous scale is about 1.04 to 3.46 W/mK at 25° C. and that of deposit or porous scale may be about 0.35 W/mK at 25° C. These values are much lower than the thermal conductivities of various metals used in cooling systems (e.g., 401 W/mK at 25° C. for copper; 250 W/mK at 25° C. for aluminum, 156 W/mK at 25° C. for magnesium, 109 W/mK at 25° C. for admiralty brass, 55 W/mK at 25° C. for cast iron, or 16 W/mK @ 25° C. for stainless steel). In short, the thermal conductivity of scales and deposits are in the range of a fireclay brick which is used as heat insulation material at 500° C. (1.4 W/mK). Excessive scale or corrosion product deposition may also lead to restriction of coolant flow in the radiator and heater core tubes, even plugging the heater core and/or radiator. Substantial heat transfer rate reduction and flow restriction of the coolant may lead to overheating of the engine.

In addition to providing reliable corrosion protection for various metallic components in the cooling systems, an engine coolant should also have the following properties to fulfill its requirements for use as a year-round functional fluid for a vehicle: high thermal conductivity; high heat capacity or high specific heat; good fluidity within the temperature range of use; high boiling point; low freeze point; low viscosity; low toxicity and safety of use; cost effectiveness and adequacy of supply; chemically stable over the temperature and conditions of use; low foaming tendency; and good material compatibility (i.e., does not corrode, erode, or degrade system materials—including both metallic and nonmetallic materials). The heat transfer fluid concentrates described herein below may be used to provide one or more of the above-described properties.

In accordance with the present teachings, heat transfer fluid concentrates and ready-to-use heat transfer fluids derived from heat transfer fluid concentrates (e.g., by dilution with water) exhibit a synergistic effect between the components of the formulation with respect to corrosion inhibition. As further described below, the synergistic heat transfer fluid concentrates and ready-to-use heat transfer fluids derived therefrom contain one or more organophosphates (a.k.a. phosphate esters).

Throughout this description and in the appended claims, the following definitions are to be understood:

The term "heteroatom" refers to any atom other than carbon and hydrogen. Representative examples of heteroatoms in accordance with the present teachings include but are not limited to nitrogen, oxygen, sulfur, and the like.

The term "alkyl" refers to a substituted or unsubstituted, straight, branched or cyclic hydrocarbon chain containing, in some embodiments, from 1 to 24 carbon atoms. Representative examples of unsubstituted alkyl groups in accordance with the present teachings include but are not limited to methyl, ethyl, propyl, iso-propyl, cyclopropyl, butyl, iso-butyl, tert-butyl, sec-butyl, cyclobutyl, pentyl, cyclopentyl, hexyl, cyclohexyl, and the like.

The term "alkenyl" refers to a substituted or unsubstituted, straight, branched or cyclic, unsaturated hydrocarbon chain that contains at least one double bond and, in some embodiments, from 2 to 24 carbon atoms. Representative unsubstituted alkenyl groups in accordance with the present teachings include but are not limited to ethenyl or vinyl ($-CH=CH_2$), 1-propenyl, 2-propenyl or allyl ($-CH_2-CH=CH_2$), 1,3-butadienyl ($-CH=CHCH=CH_2$), 1-butenyl ($-CH=CHCH_2CH_3$), hexenyl, pentenyl, 1, 3, 5-hexatrienyl, and the like. In some embodiments, cycloalkenyl groups have from five to eight carbon atoms and at least one double bond. Representative cycloalkenyl groups in accordance with the present teachings include but are not limited to cyclohexadienyl, cyclohexenyl, cyclopentenyl, cycloheptenyl, cyclooctenyl, cyclohexadienyl, cycloheptadienyl, cyclooctatrienyl, and the like.

The term "alkoxy" refers to a substituted or unsubstituted —O-alkyl group. Representative unsubstituted alkoxy groups in accordance with the present teachings include but are not limited to methoxy, ethoxy, n-propoxy, iso-propoxy, n-butoxy, tert-butoxy, and the like.

The terms "siloxy" and "silyloxy" refer to silicon substituted oxygen groups. The silicon-containing portion of the siloxy group may be substituted or unsubstituted. Representative siloxy groups in accordance with the present teachings include but are not limited to trimethylsilyloxy ($-OSi(CH_3)_3$), triethylsilyloxy ($-OSi(CH_2CH_3)_3$), triisopropylsiloxy ($-OSi(i-Pr)_3$), tert-butyidimethylsilyloxy ($-OSi(tert-Bu)(CH_3)_2$), and the like.

The term "alkynyl" refers to a substituted or unsubstituted, straight, branched or cyclic unsaturated hydrocarbon chain containing at least one triple bond and, in some embodiments, from 2 to 20 carbon atoms.

The term "aryl" refers to a substituted or unsubstituted mono-, bi-, or poly-cyclic aromatic ring system of 4-20 carbon atoms. Representative aryl groups in accordance with the present teachings include but are not limited to benzene, substituted benzene (e.g., toluene, xylenes, styrene), naphthalene, anthracene, biphenyl, and the like.

The term "amino" refers to an unsubstituted or substituted amino (—NH$_2$) group. The amine may be primary (—NH$_2$), secondary (—NHR$^a$) or tertiary (—NR$^a$R$^b$, wherein R$^a$ and R$^b$ are the same or different). Representative substituted amino groups in accordance with the present teachings include but are not limited to methylamino, dimethylamino, ethylamino, diethylamino, 2-propylamino, 1-propylamino, di(n-propyl)amino, di(iso-propyl)amino, methyl-n-propylamino, tert-butylamino, and the like.

The term "halogen" refers to fluorine, chlorine, iodine or bromine.

The term "heterocyclic" refers to a saturated, partially unsaturated, or aromatic ring system containing from 3 to 24 carbon atoms (in some embodiments, 4 to 22 carbon atoms; in other embodiments 6 to 20 carbon atoms) and at least one heteroatom (in some embodiments 1 to 3 heteroatoms). The ring may optionally be substituted with one or more substituents. Moreover, the ring may be mono-, bi- or polycyclic. As used herein, the term "heterocyclic" subsumes the term "heteroaryl." Representative heteroatoms for inclusion in the ring include but are not limited to nitrogen, oxygen, and sulfur. Representative heterocyclic groups in accordance with the present teachings include but are not limited to aziridine, azirine, oxirane, oxirene, thiirane, thiirene, diazirine, oxaziridine, dioxirane, azetidine, azete, oxetane, oxete, thietane, thiete, diazetidine, dioxetane, dioxete, dithietane, dithiete, pyrrolidine, tetrahydrofuran, thiolane, imidazolidine, pyrazolidene, oxazolidine, isooxazolidine, thiazolidine, isothiazolidene, dioxolane, dithiolane, furazan, oxadiazole, dithiazole, tetrazole, piperidine, oxane, pyran, thiane, thiopyran, piperazine, diazines, morpholine, oxazine, thiomorpholine, thiazine, dioxane, dioxine, dithiane, dithiine, trioxane, trithiane, tetrazine, azepane, azepine, oxepane, oxepine, thiepane, thiepine, homopiperazine, diazepine, thiazepine, azocane, azocine, acridine, benzathiazoline, benzimidazole, benzofuran, benzothiapene, benzthiazole, benzothiophenyl, carbazole, cinnoline, furan, imidazole, 1H-indazole, indole, isoindole, isoquinoline, isothiazole, oxazole, isoxazole, oxadiazoles (e.g., 1,2,3-oxadiazole), phenazine, phenothiazine, phenoxazine, phthalazine, pteridine, purine, pyrazine, pyrazole, pyridazine, pyridine, pyrimidine, pyrrole, quinazoline, quinoline, quinoxaline, thiazole, thiadiazoles (e.g., 1,3,4-thiadiazole), thiophene, triazine (e.g., 1,3,5-triazine), triazoles (e.g., 1,2,3-triazole), and the like.

The term "substituted" refers to the optional attachment of one or more substituents onto a backbone structure (e.g., an alkyl backbone, an alkenyl backbone, a heterocyclic backbone, etc.). Representative substituents for use in accordance with the present teachings include but are not limited to hydroxyl, amino (—NH$_2$, —NHR$^a$, —NR$^a$R$^b$), oxy (—O—), carbonyl (—CO—), thiol, alkyl, alkenyl, alkynyl, alkoxy, halo, nitrile, nitro, aryl and heterocyclyl groups. These substituents may optionally be further substituted with 1-3 substituents. Examples of substituted substituents include but are not limited to carboxamide, alkylmercapto, alkylsulphonyl, alkylamino, dialkylamino, carboxylate, alkoxycarbonyl, alkylaryl, aralkyl, alkylheterocyclyl, heterocyclylaryl, haloalkyl, and the like. The substituent should not substantially interfere chemically with the reaction of the invention (e.g., cross react with reactants, terminate the reaction or the like).

It is to be understood that elements and features of the various representative embodiments described below may be combined in different ways to produce new embodiments that likewise fall within the scope of the present teachings.

By way of general introduction, a heat transfer fluid concentrate in accordance with the present teachings includes (a) a freezing point depressant, water, or a combination thereof; (b) an organophosphate; (c) a carboxylic acid or a salt thereof; and (d) a component selected from the group consisting of an alkaline earth metal ion, an alkali metal ion, a transition metal ion, an inorganic phosphate, molybdate ion, nitrate ion, nitrite ion, an azole compound, a copper and copper alloy corrosion inhibitor, a silicate, a silicate stabilizer, a water-soluble polymer, and combinations thereof.

In some embodiments, a heat transfer fluid concentrate in accordance with the present teachings optionally further includes one or a plurality of additional components selected from the group consisting of a phosphonate, a phosphinate, a colorant, a biocide, an antifoam, a surfactant, a dispersant, an antiscalant, a wetting agent, an additional corrosion inhibitor, and combinations thereof. In some embodiments, the pH of a heat transfer fluid concentrate in accordance with the present teachings at 50% concentration is between about 6.8 and about 10.0.

Heat transfer fluid concentrates in accordance with the present teachings include a freezing point depressant, water, or a combination thereof. Representative freezing point depressants suitable for use in a heat transfer fluid concentrate in accordance with the present teachings include but are not limited to alcohol and mixture of alcohols (e.g., monohydric alcohols, polyhydric alcohols, and mixtures thereof). Representative alcohols for use as freezing point depressants include but are not limited to methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, tripropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, alkoxy alkanols (e.g., methoxyethanol), and the like, and combinations thereof.

In some embodiments, the freezing point depressant comprises an alcohol which, in some embodiments, is selected from the group consisting of ethylene glycol, 1,2-propylene glycol, 1,3-propanediol, glycerol, and a combination thereof. In some embodiments, a heat transfer fluid concentrate in accordance with the present teachings contains a glycol freezing point depressant. The concentration of freezing point depressant may vary depending on the application. By way of example, in some embodiments, the concentration of the freezing point depressant may range from about 0 wt. % to about 60 wt. % based on the total weight of the heat transfer fluid concentrate (e.g., from about 0 wt. % to about 50 wt. %, from about 5 wt. % to about 40 wt. %, or from about 11 wt. % to about 25 wt. %). In other embodiments, the concentration of the freezing point depressant may range from about 1 wt. % to about 99 wt. %, in some embodiments from about 10 wt. % to about 99.9 wt. %, based on the total weight of the heat transfer fluid concentrate (e.g., from about 30 wt. % to about 99.5 wt. % or from about 40 wt. % to about 99 wt. %). In some embodiments, the concentration of the freezing point depressant ranges from about 15 wt. % to about 99% wt. % based on the total weight of the heat transfer fluid concentrate. In other embodiments, the concentration of the freezing point depressant ranges from about 20 wt. % to about 98% wt. % based on the total weight of the heat transfer fluid concentrate. In further embodiments, the concentration of the freezing point depressant ranges from about 20 wt. % to about 96% wt. % based on the total weight of the heat transfer fluid concentrate.

Heat transfer fluid concentrates in accordance with the present teachings may include water in addition to, or as an alternative to, a freezing point depressant. Ready-to-use heat transfer fluids derived from heat transfer fluid concentrates (e.g., by dilution) typically contain water. In some embodiments, a heat transfer fluid concentrate in accordance with the present teachings that contains a freezing point depressant may be diluted with water to a 30 vol. % to 60 vol. % solution.

The type of water used in accordance with the present teachings is not restricted. However, in some embodiments, the water used in a heat transfer fluid concentrate and/or a heat transfer fluid in accordance with the present teachings includes de-ionized water, de-mineralized water, softened water, or a combination thereof. In some embodiments, a hardness of the water due to $CaCO_3$ is less than about 20 ppm. In other embodiments, an electrical conductivity of the water is less than about 300 µS/cm. In further embodiments, a hardness of the water due to $CaCO_3$ is less than about 20 ppm and an electrical conductivity of the water is less than about 300 µS/cm. The amount of water may vary depending on the application. By way of example, the concentration of the water may range from about 0.1 wt. % to about 90 wt. % based on the total weight of the heat transfer fluid concentrate (e.g., from about 0.5 wt. % to about 70 wt. % or from about 1 wt. % to about 60 wt. %).

Heat transfer fluid concentrates in accordance with the present teachings include one or more organophosphates (a.k.a. phosphate esters). In some embodiments, an organophosphate for use in accordance with the present teachings has the following structure (1):

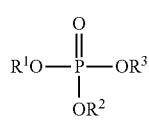

(1)

wherein $R^1$, $R^2$, and $R^3$ are each independently hydrogen, an optionally substituted heteroatom-containing alkyl, an optionally substituted heteroatom-containing alkenyl, an optionally substituted carbonyl-containing alkyl, an optionally substituted carbonyl-containing alkenyl, or an optionally substituted moiety selected from the group consisting of alkyl, alkenyl, aryl, phosphono, phosphino, alkylamino, amino, and combinations thereof. For some embodiments in which an R group of the organophosphate (i.e., $R^1$, $R^2$, and/or $R^3$) contains one or more heteroatoms, the one or more heteroatoms may form an ether linkage (e.g., —C—O—C—), a sulfide linkage (—C—S—C—), an amino linkage (—C—N—C), or a combination thereof.

Representative organophosphates for use in accordance with the present teachings include but are not limited to ethylene glycol phosphate; 1,2,3-propanetriol phosphate (CAS #: 12040-65-2); a phosphate polyether ester; a $C_6$-$C_{12}$ alkyl alcohol ethoxylate phosphoric acid (CAS #: 68921-24-4); an alkali metal salt of phosphate ester of cresyl ethoxylate (CAS #: 66057-30-5); potassium cresyl phosphate (CAS #: 37281-48-4); octylphenoxypolyethoxyethyl phosphate; octylphenoxy polyethyl phosphate; polyethylene glycol mono(octylphenyl) ether phosphate; alkali metal salts of alkylphenoxypolyethoxyethyl phosphoric acid having a formula R-phenyl$(CH_2CH_2O)_x$phosphate in which R is hydrogen or $C_1$-$C_{20}$ alkyl (in some embodiments, $C_1$-$C_{12}$) and x equals 1 to 30 (in some embodiments, 2 to 10); alkyl or aryl acid phosphates, such as isooctyl acid phosphate, 2-ethylhexyl acid phosphate, amyl acid phosphate, amyl dihydrogen phosphate, diamyl hydrogen phosphate, butyl acid phosphate, and/or the like; and combinations thereof.

Representative phosphate esters suitable for use in accordance with the present teachings are available from many suppliers including but not limited to the Dow Chemical Company (Midland, Mich.), Stepan Company (Northfield, Ill.), Solvay S.A./Rhodia Inc. (Brussels, Belgium), Ashland Inc. (Covington, Ky.), Clariant Corporation (Muttenz, Switzerland), PCC Chemax Inc. (Piedmont, S.C.), IsleChem LLC (Grand Island, N.Y.), and Lakeland Laboratories Limited (Manchester, England).

In some embodiments, the organophosphate used in accordance with the present teachings may be selected from the group consisting of phosphate polyether esters or alcohol phosphate esters including but not limited to (a) Triton™ H-66, Triton™ H-55, Triton™ QS-44, and/or Triton™ XQS-20 surfactants from the Dow Chemical Company; (b) Rhodafac® H-66 or potassium salt of phosphate ester of cresyl ethoxylate (CAS no. 66057-30-5), Rhodafac H-66-E or potassium salt of aromatic ethoxylate phosphate esters, Rhodafac HA-70 or polyoxyethylene phenyl ester phosphate acid form (CAS no. 39464-70-5), Rhodafac PA 23 or ethoxylated fatty alcohol phosphate ester (CAS no. 68585-36-4), and/or Rhodafac LO/529-E or sodium salt of ethoxylated alkylphenol phosphate (CAS no. 68954-84-7) from Rhodia; (c) Cedephos FA-600 containing $C_6$-$C_{12}$ alkyl alcohol ethoxylate phosphoric acids (CAS. no. 68921-24-4, alt CAS no. 68130-47-2) and/or MERPOL A (alcohol phosphate) from Stepan Company; (d) Chemfac NF-100 (98% polyphosphoric acids, esters with ethylene glycol, CAS no. 68553-96-8) or ethylene glycol phosphate, Chemfac NA-350 or 1,2,3-propanetriol phosphate (CAS no. 12040-65-2, as the main component in Chemfac NA-350), Chemfac PB-106K (polyoxyethylene decyl phosphate, potassium salt, or poly(oxy-1,2-ethanediyl), alpha-isodecyl-omega-hydroxy-, phosphate, potassium salt, CAS. no. 68071-17-0), Chemfac PB-184 (POE Oleyl phosphate or poly(oxy-1,2-ethanediyl), alpha-9-octadecenyl-omega-hydroxy-(Z)—, phosphate, CAS no. 39464-69-2), Chemfac PF-636 (poly (oxy-1,2-ethanediyl), alpha-hydro-omega-hydroxy, phosphate, CAS no. 9056-42-2), Chemfac PB-264 (POE ether phosphate or poly(oxy-1,2-ethanediyl), alpha-hydro-omega-hydroxy-, mono-C12-14-alkyl ethers, phosphates, CAS no. 68511-37-5), Chemfac NC-096 (POE (6) Nonyl Phenol phosphate, or poly(oxy-1,2-ethanediyl), alpha-(nonylphenyl)-omega-hydroxy, branched, phosphates, CAS no. 68412-53-3), Chemfac NB-041 (POE aliphatic phosphate ester), Chemfac NB-042 (POE aliphatic phosphate ester), Chemfac 126 (POE aliphatic phosphate ester), Chemfac NB-159 (POE aliphatic phosphate ester), Chemfac NC-006E (POE aliphatic phosphate ester), Chemfac NC-0910 (POE aliphatic phosphate ester), Chemfac PB-082 (POE aliphatic phosphate ester), Chemfac PB-104 (POE aliphatic phosphate ester), Chemfac PB-109, Chemfac PB-133, Chemfac PB-135, Chemfac PB-136, Chemfac PB-139, Chemfac PB-253, Chemfac PC-006, Chemfac PC-099, Chemfac PC-188, Chemfac PD-600, Chemfac PD-990, and/or Chemfac PF-623 from PCC Chemax Inc.; (e) phosphated alcohols, such as PA 100, PA 800, PA 800K, and PA 801 from Lakeland Laboratories Ltd.; (f) phosphated alcohol ethoxylates, such as PAE 802, PAE 106, PAE 126, PAE 136, PAE147, PAE 176, PAE 185 and PAE 1780 from Lakeland Laboratories Ltd.; (g) phosphated phenol ethoxylates, such as PPE 604, PPE 604K, PPE 154, PPE 156, PPE 159 and PPE 1513 from Lakeland Laboratories Ltd.; (h) and/or the like; and (i) combinations thereof.

In some embodiments, the organophosphates for use in accordance with the present teachings include alkyl and aryl acid phosphates. Representative alkyl or aryl acid phosphates that may be used in accordance with the present teachings include but are not limited to amyl acid phosphate, n-butyl acid phosphate, methyl acid phosphate, phenyl acid phosphate, 2-ethylhexyl acid phosphate, dimethyl acid phosphate, isooctyl acid phosphate, and/or the like, and combinations thereof. Mono-alkyl/aryl acid phosphates, dialkyl/aryl acid phosphates, or a combination thereof may be used in accordance with the present teachings.

In some embodiments, organophosphates for use in accordance with the present teachings include ethylene glycol phosphate (e.g., Chemfac NF-100), phosphate polyether esters (e.g., Triton H-66), or a combination thereof. Phosphate polyether esters suitable for use in accordance with the present teachings include but are not limited to the ones described in U.S. Pat. Nos. 3,235,627; 3,462,520; 3,294,693; and 3,462,520.

The amount of organophosphate may vary depending on the application. By way of example, the concentration of the one or more organophosphates may range from about 0.0025 wt. % to about 10 wt. % based on the total weight of the heat transfer fluid concentrate (e.g., from about 0.005 wt. % to about 5 wt. %, from about 0.01 wt. % to about 3 wt. %, from about 0.05 wt. % to about 2 wt. %, or from about 0.05 wt. % to about 0.5 wt. %). Within this range, the amount may be greater than or equal to about 0.005 wt. %, and, in some embodiments, greater than or equal to about 0.01 wt. %. Also within this range, the amount may be less than or equal to about 1 wt. % and, in some embodiments, less than or equal to about 0.5 wt. %.

Heat transfer fluid concentrates in accordance with the present teachings include one or a plurality of carboxylates. As used herein, the term "carboxylate" is inclusive of carboxylic acid, salts thereof, and combinations of one or more carboxylic acids and one or more carboxylic acid salts. The carboxylic acid salts suitable for use include alkali metal (such as lithium, sodium, and potassium, etc.) salts and alkaline earth metal (such as calcium, magnesium and strontium, etc.) salts. The carboxylate may include a single or multiple carboxyl groups and may be linear or branched. It is expressly contemplated that combinations of carboxylates may be used and such combinations are encompassed by the terms "carboxylate" and "carboxylic acid". In some embodiments, a carboxylate in accordance with the present teachings has from 4 to 24 carbon atoms (e.g., 4 to 22 carbon atoms). In other embodiments, a carboxylate in accordance with the present teachings has from 6 to 20 carbon atoms. The carboxylate may be aliphatic, aromatic, or a combination of both. In some embodiments, the carboxylic acid is a $C_6$ to $C_{20}$ mono- or di-basic aliphatic or aromatic carboxylic acid and/or an alkali metal salt thereof. In some embodiments, a carboxylate in accordance with the present teachings consists of carbon, hydrogen, and oxygen and is free of non-oxygen heteroatoms. Representative aliphatic carboxylates for use in accordance with the present teachings include but are not limited to 2-ethyl hexanoic acid, hexanoic acid, heptanoic acid, octanoic acid, neodecanoic acid, decanoic acid, nonanoic acid, isoheptanoic acid, dodecanoic acid, sebacic acid, adipic acid, pimelic acid, suberic acid, azelaic acid, dodecanedioic acid, and/or the like, and combinations thereof. Representative aromatic carboxylates include but are not limited to benzoic acid, toluic acid (methylbenzoic acid), tert-butyl benzoic acid, alkoxy benzoic acid (e.g., methoxybenzoic acid, such as o-, p-, or m-anisic acid), salicylic acid, phthalic acid, isophthalic acid, terephthalic acid, phenylacetic acid, mandelic acid, 1,2,4-benzenetricarboxylic acid, and/or the like, and combinations thereof.

In some embodiments, the carboxylate used in a heat transfer fluid concentrate in accordance with the present teachings includes a plurality of carboxylates. In some embodiments, the carboxylate includes an aliphatic mono-carboxylate, an aliphatic di-carboxylate, an aromatic mono-carboxylate, an aromatic di-carboxylate, or a combination thereof. In some embodiments, the carboxylate includes one or a plurality of $C_6$-$C_{20}$ carboxylates, and each of the one or the plurality of $C_6$-$C_{20}$ carboxylates is individually selected from the group consisting of an aliphatic mono-carboxylate, an aliphatic di-carboxylate, an aromatic mono-carboxylate, an aromatic di-carboxylate, and a combination thereof. In some embodiments, the carboxylate includes neodecanoic acid and at least one additional $C_6$ to $C_{20}$ mono- or di-basic aliphatic or aromatic carboxylic acid. In some embodiments, the carboxylate includes 2-ethyl hexanoic acid, neodecanoic acid, or a combination thereof.

The concentration of carboxylate may vary depending on the application. In some embodiments, the carboxylate is present in an amount from about 0.1 wt. % to about 25 wt. %, in some embodiments about 1 wt. % to about 10 wt. %, based on the total weight of the heat transfer fluid concentrate. Within this range, the amount may be greater than or equal to about 1.5 wt. %, and, in some embodiments, greater than or equal to about 2 wt. %. Also within this range, the amount may be less than or equal to about 7 wt. % and, in some embodiments, less than or equal to about 5 wt. %.

Heat transfer fluid concentrates in accordance with the present teachings include one or a combination of more than one components selected from the following list: a component selected from the group consisting of an alkaline earth metal ion, an alkali metal ion, a transition metal ion, an inorganic phosphate, molybdate ion, nitrate ion, nitrite ion, an azole compound, a copper and copper alloy corrosion inhibitor, a silicate, a silicate stabilizer, a water-soluble polymer, and combinations thereof. In some embodiments, a heat transfer fluid concentrate in accordance with the present teachings may specifically exclude one or more of the aforementioned components (e.g., be substantially "free" of one or more of the aforementioned components).

In accordance with the present teachings, heat transfer fluid concentrates may include at least one metal ion (e.g., a metal ion derived from a water-soluble metal salt, an insoluble or poorly water-soluble metal compound, a metal oxide, and/or the like, and combinations thereof). In some embodiments, the metal ion may be derived from a water-soluble alkaline earth metal salt (e.g., a calcium salt, a magnesium salt, and/or a strontium salt), an alkaline earth metal compound (e.g., a calcium compound, a magnesium compound, and/or a strontium compound), an alkaline earth metal oxide (e.g., calcium oxide, magnesium oxide, and/or strontium oxide), a water-soluble alkali metal salt (e.g., a lithium salt), an alkali metal compound (e.g., a lithium compound), an alkali metal oxide (e.g., lithium oxide), a transition metal salt (e.g., a zinc salt), a transition metal compound (e.g., a zinc compound), a transition metal oxide (e.g., zinc oxide), and/or a combination thereof.

In some embodiments, a heat transfer fluid concentrate in accordance with the present teachings includes one or more water-soluble alkaline earth metal salts, which will produce an alkaline earth metal ion (in some embodiments, $Ca^{2+}$, $Mg^{2+}$, and/or $Sr^{2+}$) upon dissolution in water. In some embodiments, a heat transfer fluid concentrate in accordance with the present teachings includes one or more water-soluble alkaline earth metal oxides, which will produce an alkaline earth metal ion in the heat transfer fluid (in some embodiments, $Ca^{2+}$, $Mg^{2+}$, and/or $Sr^{2+}$) upon mixing with other acidic components of the heat transfer fluids (e.g., carboxylic acids and/or organophosphates). In some embodiments, the concentration of the alkaline earth metal ion derived from one or more water-soluble alkaline earth metal salts and/or one or more alkaline earth metal oxides is in the range of about 0 mg/L to about 200 mg/L (i.e., up to about 200 mg/L) in the heat transfer fluid concentrate.

In some embodiments, heat transfer fluid concentrates in accordance with the present teachings may include a water-soluble alkaline earth metal salt and/or an alkaline metal compound that provides a source of calcium ions. In some embodiments, the calcium ions are derived from one or a plurality of calcium compounds or salts (e.g., one or more water-soluble calcium salts). In some embodiments, the calcium ions are derived from one or a plurality of water-soluble calcium salts that are configured to at least partially disassociate in an aqueous solution at room temperature. In some embodiments, the one or the plurality of calcium salts are configured to produce between about 1 and about 60 mg/L calcium ions ($Ca^{2+}$) in the heat transfer fluid concentrate upon dissolution.

Calcium compounds for use in accordance with the present teachings include but are not limited to inorganic calcium compounds and calcium salts of organic acids containing one or a plurality of carboxylic acid groups. Representative inorganic calcium compounds include but are not limited to calcium hydroxide, calcium oxide, calcium molybdate, calcium vanadate, calcium tungstate, calcium perchlorate, calcium chloride, and/or the like, hydrates of any of the aforementioned salts, and combinations thereof. Representative calcium salts of organic acids include but are not limited to calcium acetate, calcium formate, calcium propionate, calcium polymaleate, calcium polyacrylate, calcium lactate, calcium gluconate, calcium glycolate, calcium glucoheptonate, calcium citrate, calcium tartrate, calcium glucarate, calcium succinate, calcium hydroxysuccinate, calcium adipate, calcium oxalate, calcium malonate, calcium sulfamate, calcium salts of aliphatic tri-carboxylic acid, calcium salts of aliphatic tetra-carboxylic acid, and/or the like, hydrates of any of the aforementioned calcium salts, and combinations thereof.

In some embodiments, the calcium compound may be a calcium salt formed between calcium ions and a phosphonate or a phosphinate, such as calcium-PBTC salts (where PBTC is 2-phosphonobutane-1,2,4-tricarboxylic acid), calcium-HEDP salts (where HEDP is 1-hydroxethane-1,1-diphosphonic acid), calcium-HPA salts (where HPA is hydroxyphosphono-acetic acid or 2-hydroxy phosphono acetic acid), calcium phosphonosuccinic acid salts, calcium-PSO salts (where PSO is mono-, bis- and oligomeric phosphinosuccinic acid adduct mixtures as described in U.S. Pat. No. 6,572,789 B1), and/or the like, and combinations thereof.

The concentration of calcium ion ($Ca^{2+}$) may vary depending on the application. In some embodiments, one or more calcium compounds present in a heat transfer fluid concentrate are soluble in the heat transfer fluid concentrate. As used herein, the term "soluble" refers to a degree of dissolution such that that no particulate matter remains visible to the naked eye. In some embodiments, the concentration of $Ca^{2+}$ in a heat transfer fluid concentrate in accordance with the present teachings is between about 0 mg/L and about 200 mg/L (i.e., up to about 200 mg/L). In other embodiments, the concentration $Ca^{2+}$ in a heat transfer fluid concentrate in accordance with the present teachings is between about 0.1 mg/L and about 150 mg/L, between about 0.1 mg/L and about 80 mg/L, between about 0.2 mg/L and about 60 mg/L, 0.2 mg/L and about 40 mg/L, or between about 1 mg/L and about 60 mg/L. In further embodiments, the concentration of calcium ion is between about 3 mg/L and about 40 mg/L. In still further embodiments, the concentration of calcium ion is between about 4 mg/L and about 30 mg/L.

In some embodiments, heat transfer fluid concentrates in accordance with the present teachings may include a water-soluble alkaline earth metal salt and/or an alkaline earth metal compound that provides a source of magnesium ions. In some embodiments, the magnesium ions are derived from one or a plurality of magnesium compounds or salts (e.g., one or more water-soluble magnesium salts). In some embodiments, the magnesium ions are derived from one or a plurality of water-soluble magnesium salts that are configured to at least partially disassociate in an aqueous solution at room temperature. In some embodiments, the one or the plurality of magnesium salts are configured to produce up to about 150 mg/L magnesium ions in the heat transfer fluid concentrate upon dissolution based on the total weight of the heat transfer fluid concentrate.

Magnesium compounds for use in accordance with the present teachings include but are not limited to inorganic magnesium compounds and magnesium salts of organic acids containing one or a plurality of carboxylic acid groups. Representative inorganic magnesium compounds include but are not limited to magnesium molybdate, magnesium hydroxide, magnesium oxide, magnesium tungstate, magnesium sulfate, magnesium perchlorate, magnesium chloride, magnesium vanadate, and/or the like, hydrates of any of the aforementioned magnesium salts, and combinations thereof. Representative magnesium salts of organic acids include but are not limited to magnesium formate, magnesium acetate, magnesium propionate, magnesium polyacrylate, magnesium polymaleate, magnesium lactate, magnesium gluconate, magnesium glycolate, magnesium glucoheptonate, magnesium citrate, magnesium tartrate, magnesium glucarate, magnesium succinate, magnesium hydroxysuccinate, magnesium adipate, magnesium oxalate, magnesium malonate, magnesium sulfamate, and/or the like, and combinations thereof.

In some embodiments, the magnesium compound may be a magnesium salt formed between magnesium ions and a phosphonate or a phosphinate, such as magnesium-PBTC salts (where PBTC is 2-phosphonobutane-1,2,4-tricarboxylic acid), magnesium-HEDP salts (where HEDP is 1-hydroxethane-1,1-diphosphonic acid), magnesium-HPA salts (where HPA is hydroxyphosphono-acetic acid or 2-hydroxy phosphono acetic acid), magnesium phosphonosuccinic acid salts, magnesium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of magnesium ion may vary depending on the application. In some embodiments, one or more magnesium compounds present in a heat transfer fluid concentrate are soluble in the heat transfer fluid concentrate. In some embodiments, the concentration of magnesium ion ($Mg^{2+}$) in a heat transfer fluid concentrate in accordance with the present teachings is between about 0 mg/L and about 200 mg/L (i.e., up to about 200 mg/L). In other embodiments, the concentration of $Mg^{2+}$ in a heat transfer fluid concentrate in accordance with the present teachings is between about 0 mg/L and about 150 mg/L (i.e., up to about 150 mg/L), between about 1 mg/L and about 100 mg/L, between about 0.1 mg/L and about 80 mg/L, between about 0.2 mg/L and about 40 mg/L, or between about 1 mg/L and about 50 mg/L (e.g., 1 mg/L and 25 mg/L). In further embodiments, the concentration of magnesium ion is between about 3 mg/L and about 80 mg/L. In other embodiments, the concentration of magnesium ion is between about 2 mg/L and about 35 mg/L. In further embodiments, the concentration of magnesium ion is between about 4 mg/L and about 30 mg/L.

In some embodiments, heat transfer fluid concentrates in accordance with the present teachings may include a water-soluble alkaline earth metal salt and/or an alkaline earth metal compound that provides a source of strontium ions. In some embodiments, the strontium ions are derived from one or a plurality of strontium compounds or salts (e.g., one or more water-soluble strontium salts). In some embodiments, the strontium ions are derived from one or a plurality of water-soluble strontium salts that are configured to at least partially disassociate in an aqueous solution at room temperature. In some embodiments, the one or the plurality of strontium salts are configured to produce up to about 50 mg/L strontium ions in the heat transfer fluid concentrate upon dissolution based on the total weight of the heat transfer fluid concentrate.

Strontium compounds for use in accordance with the present teachings include but are not limited to inorganic strontium compounds and strontium salts of organic acids containing one or a plurality of carboxylic acid groups. Representative inorganic strontium compounds include but are not limited to strontium hydroxide, strontium oxide, strontium chloride, strontium perchlorate, strontium nitrate, strontium iodide, strontium sulfate, strontium borate, strontium phosphate, strontium dihydrogen phosphate, strontium molybdate, strontium tungstate, strontium titanate, and/or the like, hydrates of any of the aforementioned strontium salts, and combinations thereof. A strontium compound may also be a strontium salt formed between a strontium ion and an organic acid containing one or more carboxylic acid groups, or one or more phosphonic acid groups, or one or more phosphinic acid groups, or a combination of these functional groups. Representative strontium salts of organic acids include but are not limited to strontium formate, strontium acetate, strontium propionate, strontium butyrate, strontium polyacrylate, strontium lactate, strontium polymaleate, strontium gluconate, strontium glycolate, strontium glucoheptonate, strontium citrate, strontium tartrate, strontium glucarate, strontium succinate, strontium hydroxysuccinate, strontium adipate, strontium oxalate, strontium malonate, strontium sulfamate, strontium sebacate, strontium benzoate, strontium phthalate, strontium salicylate, strontium-PBTC (where PBTC is 2-phosphonobutane-1,2,4-tricarboxylic acid) salts, strontium—HEDP (where HEDP is 1-hydroxyethane-1,1-diphosphonic acid) salts, strontium-HPA (where HPA is hydroxyphosphono-acetic acid or 2-hydroxy phosphono acetic acid) salts, strontium phosphonosuccinic acid salts, strontium-PSO (where PSO is mono, bis and oligomeric phosphinosuccinic acid adduct mixtures) salts, or hydrates of these salts, or a combination of the foregoing strontium compounds.

The concentration of strontium ion may vary depending on the application. In some embodiments, one or more strontium compounds present in a heat transfer fluid concentrate are soluble in the heat transfer fluid concentrate. In some embodiments, the concentration of strontium ion ($Sr^{2+}$) in a heat transfer fluid concentrate in accordance with the present teachings is between about 0 mg/L and about 50 mg/L (i.e., up to about 50 mg/L). In other embodiments, the concentration of $Sr^{2+}$ in a heat transfer fluid concentrate in accordance with the present teachings is between about 0.1 mg/L and about 40 mg/L, between about 0.5 mg/L and about 30 mg/L, between about 1 mg/L and about 25 mg/L, between about 2 mg/L and about 20 mg/L, or between about 4 mg/L and about 16 mg/L.

In some embodiments, heat transfer fluid concentrates in accordance with the present teachings may include one or a plurality of inorganic phosphates. The inorganic phosphate used in accordance with the present teachings is configured to generate phosphate ions upon dissolution in an aqueous solution. Representative inorganic phosphates for use in accordance with the present teachings include but are not limited to orthophosphates such as phosphoric acid, alkali metal orthophosphates (e.g., sodium orthophosphate, potassium orthophosphate, etc.), other water-soluble alkaline metal phosphate salts, and/or the like, and combinations thereof. In some embodiments, an inorganic phosphate for use in accordance with the present teachings is selected from the group consisting of phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, and/or the like, and combinations thereof. In some embodiments, the inorganic phosphate includes phosphoric acid and/or one or more additional orthophosphates including but not limited to alkali metal orthophosphates and/or other water-soluble alkaline metal phosphate salts.

The concentration of inorganic phosphate may vary depending on the application. In some embodiments, the phosphate ion concentration in a heat transfer fluid concentrate in accordance with the present teachings ranges from about 0.00 wt. % to about 5 wt. % (i.e., up to about 5 wt. %) based on the total weight of the heat transfer fluid. In other embodiments, the phosphate ion concentration ranges from about 0.01 wt. % to about 1 wt. % based on the total weight of the heat transfer fluid. In some embodiments, the inorganic phosphate may be present in the heat transfer fluid concentrate an amount of between about 0.10 wt. % and about 0.60 wt. % based on the total weight of the heat transfer fluid concentrate. Within this range, the amount may be greater than or equal to about 0.11 wt. % and, in some embodiments, greater than or equal to about 0.12 wt. %. Also within this range, the amount may be less than or equal to about 0.45 wt. % and, in some embodiments, less than or equal to about 0.40 wt. %.

In some embodiments, heat transfer fluid concentrates in accordance with the present teachings may include lithium ions. In some embodiments, the lithium ions are derived from one or a plurality of lithium compounds or salts (e.g., one or more water-soluble lithium salts). In some embodiments, the lithium ions are derived from one or a plurality of water-soluble lithium salts that are configured to at least partially disassociate in an aqueous solution at room temperature. In some embodiments, the one or the plurality of lithium salts are configured to produce lithium ion in a concentration ranging from about 0 ppm to about 6000 ppm (i.e., up to about 6000 ppm) in the heat transfer fluid concentrate upon dissolution based on the total weight of the heat transfer fluid concentrate.

Lithium compounds for use in accordance with the present teachings include but are not limited to inorganic lithium compounds and lithium salts of organic acids containing one or a plurality of carboxylic acid groups. Representative inorganic lithium compounds include but are not limited to lithium hydroxide, lithium oxide, lithium phosphate, lithium borate, lithium perchlorate, lithium sulfate, lithium molybdate, lithium vanadate, lithium tungstate, lithium carbonate, and/or the like, hydrates of any of the aforementioned lithium salts, and combinations thereof. Representative lithium salts of organic acids include but are not limited to lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate, and/or the like, and combinations thereof.

In some embodiments, the lithium compound may be a lithium salt formed between lithium ions and a phosphonate or a phosphinate, such as lithium-PBTC salts (where PBTC is 2-phosphonobutane-1,2,4-tricarboxylic acid), lithium-HEDP salts (where HEDP is 1-hydroxethane-1,1-diphosphonic acid), lithium-HPA salts (where HPA is hydroxyphosphono-acetic acid or 2-hydroxy phosphono acetic acid), lithium phosphonosuccinic acid salts, lithium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of lithium ion may vary depending on the application. In some embodiments, one or more lithium compounds present in a heat transfer fluid concentrate are soluble in the heat transfer fluid concentrate. In some embodiments, the concentration of lithium ion ($Li^+$) in a heat transfer fluid concentrate in accordance with the present teachings is between about 0 ppm and about 6000 ppm (e.g., between about 0 ppm and about 5000 ppm) based on the total weight of the heat transfer fluid concentrate. Within this range, the lithium ion concentration may be less than about 4000 ppm and, in some embodiments, less than or equal to about 3000 ppm. Also within this range, the lithium ion concentration may be greater than or equal to about 50 ppm and, in some embodiments, greater than or equal to about 100 ppm, and in other embodiments greater than or equal to about 200 ppm.

In some embodiments, heat transfer fluid concentrates in accordance with the present teachings may include zinc ions. In some embodiments, the zinc ions are derived from one or a plurality of zinc compounds or salts (e.g., one or more water-soluble zinc salts). In some embodiments, the zinc ions are derived from one or a plurality of water-soluble zinc salts that are configured to at least partially disassociate in an aqueous solution at room temperature. In some embodiments, the one or the plurality of zinc salts are configured to produce zinc ion in a concentration ranging from about 0 ppm to about 50 ppm (i.e., up to about 50 ppm) in the heat transfer fluid concentrate upon dissolution based on the total weight of the heat transfer fluid concentrate. Zinc compounds for use in accordance with the present teachings include but are not limited to inorganic zinc compounds and zinc salts of organic acids containing one or a plurality of carboxylic acid groups. Representative inorganic zinc compounds include but are not limited to zinc hydroxide, zinc oxide, zinc nitrate, zinc sulfate, zinc chloride, zinc perchlorate, zinc chlorate, zinc bromide, zinc bromate, zinc iodide, and/or the like, hydrates of any of the aforementioned zinc salts, and combinations thereof. A zinc compound suitable for use may also be a zinc salt formed between a zinc ion and an organic acid containing one or more carboxylic acid groups, one or more phosphonic acid groups, one or more phosphinic acid groups, or a combination of these functional groups. Representative organic zinc salts of organic acids include but are not limited to zinc formate, zinc acetate, zinc propionate, zinc butyrate, zinc lactate, zinc glycolate, zinc gluconate, zinc glucoheptonate, zinc malonate, zinc succinate, zinc glucarate, zinc hydroxysuccinate, zinc citrate, zinc benzoate, zinc phthalate, zinc adipate, zinc salicylate, zinc polyacrylate, zinc polymaleate, zinc—PBTC (where PBTC is 2-phosphonobutane-1,2,4-tricarboxylic acid) salts, zinc—HEDP (where HEDP is 1-hydroxyethane-1,1-diphosphonic acid or 1-hydroxyethylidene-1,1-diphosphonic acid) salts, zinc-HPA (where HPA is hydroxyphosphono-acetic acid or 2-hydroxy phosphono acetic acid) salts, zinc phosphonosuccinic acid salts, zinc phosphinosuccinic salts, zinc-PSO salts (where PSO is mono, bis-, and oligomeric phosphinosuccinic acid adduct mixtures), and/or the like, hydrates of the aforementioned salts, or combinations thereof.

The concentration of zinc ion may vary depending on the application. In some embodiments, one or more zinc compounds present in a heat transfer fluid concentrate are soluble in the heat transfer fluid concentrate. In some embodiments, the concentration of zinc ion ($Zn^{2+}$) in a heat transfer fluid concentrate in accordance with the present teachings is between about 0 mg/L and about 50 mg/L (i.e., up to about 50 mg/L). In other embodiments, the concentration of $Zn^{2+}$ in a heat transfer fluid concentrate in accordance with the present teachings is between about 0.1 mg/L and about 40 mg/L, between about 0.5 mg/L and about 30 mg/L, between about 1 mg/L and about 25 mg/L, between about 2 mg/L and about 20 mg/L, or between about 4 mg/L and about 16 mg/L.

In some embodiments, heat transfer fluid concentrates in accordance with the present teachings may include one or more nitrates. In some embodiments, the nitrate ions are derived from one or a plurality of nitrate salts (e.g., one or more water-soluble nitrate salts). Representative nitrates for use in accordance with the present teachings include but are not limited to alkali metal nitrates and alkaline earth metal nitrates, such as sodium nitrate, potassium nitrate, lithium nitrate, calcium nitrate, magnesium nitrate, strontium nitrate, and/or the like, hydrates of the aforementioned salts, or combinations thereof. Representative nitrates for use in accordance with the present teachings also include but are not limited to rare earth metal nitrates, such as cerium (IV) nitrate, cerium (III) nitrate, and other rare earth metal (e.g., Sc, Y, La, Pr, Nd, Pm, Sm, Eu, Gd, Tb, Dy, Ho, Er, Tm, Lu, and Yb) nitrates, and/or the like, hydrates of the aforementioned salts, or combinations thereof.

The concentration of nitrate ion may vary depending on the application. In some embodiments, one or more nitrate compounds present in a heat transfer fluid concentrate are soluble in the heat transfer fluid concentrate. In some embodiments, the nitrate compound is present in an amount from 0 wt. % to about 4 wt. % (i.e., up to about 4 wt. %), in some embodiments about 0 wt. % to about 1 wt. % (i.e., up to about 1 wt. %), in some embodiments, about 0 wt. % to about 0.5 wt. % (i.e., up to about 0.5 wt. %) based on the total weight of the heat transfer fluid concentrate.

In some embodiments, heat transfer fluid concentrates in accordance with the present teachings may include one or more nitrites. In some embodiments, the nitrite ions are derived from one or a plurality of nitrite salts (e.g., one or more water-soluble nitrite salts). Representative nitrites for use in accordance with the present teachings include but are not limited to alkali metal nitrites and alkaline earth metal nitrites, such as sodium nitrite, potassium nitrite, lithium nitrite, calcium nitrite, magnesium nitrite, strontium nitrite, and/or the like, hydrates of the aforementioned salts, or combinations thereof. Representative nitrites for use in accordance with the present teachings also include but are not limited to rare earth metal nitrites, such as lanthanum (III) nitrate, and other rare earth metal (e.g., Sc, Y, Ce, Nd, Sm, Eu, Gd, Dy, Er and Yb, etc.) nitrites, and/or the like, hydrates of the aforementioned salts, or combinations thereof.

The concentration of nitrite ion may vary depending on the application. In some embodiments, one or more nitrite compounds present in a heat transfer fluid concentrate are soluble in the heat transfer fluid concentrate. In some embodiments, the nitrite compound is present in an amount from about 0 wt. % to about 4 wt. % (i.e., up to about 4 wt. %), in some embodiments about 0 wt. % to 1 wt. % (i.e., up to about 1 wt. %), in some embodiments, about 0 wt. % to 0.5 wt. % (i.e., up to about 0.5 wt. %) based on the total weight of the heat transfer fluid concentrate.

To protect wet ferrous alloy cylinder liner from cavitation corrosion in some heavy duty diesel engines, nitrite may be used alone or in combination with molybdate ions in coolants designated for use in heavy duty engines. The use of nitrite-containing coolants for heavy duty engines is widespread since it is required by some Original Equipment Manufacturers (i.e., engine or truck manufacturers), or by coolant standard specification requirements or recommendations (e.g., ASTM D6210, Chinese Motor Vehicle Engine Coolant Standard GB 29743-2013 and Truck Maintenance Council Recommended Practice RP329). Based on conventional recommendations for the use of nitrite to protect ferrous alloy cylinder liner from cavitation corrosion, heavy duty antifreeze/coolants may contain nitrite ions in the following concentration ranges. Heavy duty antifreeze/coolant concentrate products may contain (1) at least 2400 ppm nitrite as $NO_2^-$ or (2) a combined minimum concentration of 1560 ppm nitrite as $NO_2^-$ plus molybdate as $MoO_4^{2-}$ (wherein each of nitrite and molybdate is present in an amount of at least 600 ppm). Pre-diluted ready-to-use heavy duty coolant/antifreeze products may contain (1) at least 1200 ppm nitrite as $NO_2^-$ or (2) a minimum combined concentration of 780 ppm nitrite as $NO_2^-$ plus molybdate as $MoO_4^{2-}$ (wherein each of nitrite and molybdate is present in an amount of at least 300 ppm).

In some embodiments, heat transfer fluid concentrates in accordance with the present teachings may include molybdate ions. In some embodiments, the molybdate ions are derived from one or a plurality of salts of molybdic acid (e.g., water-soluble molybdate salts). Representative salts of molybdic acid include but are not limited to alkali metal molybdates, alkaline earth metal molybdates, molybdenum trioxide, alkali metal heteropolymolybdates, and combinations thereof. Representative molybdates suitable for use as an optional additive in a heat transfer fluid concentrate in accordance with the present teachings include but are not limited to sodium molybdate, potassium molybdate, calcium molybdate, magnesium molybdate, lithium molybdate, sodium silicoheteropolymolybdate, sodium phosphoroheteropolymolybdate, and/or the like, and combinations thereof. In addition, hydrates of alkali metal molybdates, alkaline earth metal molybdates, and/or alkali metal heteropolymolybdates (e.g., sodium molybdate di-hydrate) may also be used. In some embodiments, if molybdate ions are optionally present in a heat transfer fluid concentrate in accordance with the present teachings, the molybdate ions are not derived from lithium molybdate, calcium molybdate, strontium molybdate, magnesium molybdate, and/or zinc molybdate. In some embodiments, a heat transfer fluid concentrate in accordance with the present teachings does not include lithium molybdate, calcium molybdate, strontium molybdate, magnesium molybdate, and/or zinc molybdate. In some embodiments, the molybdate compound for use in the heat transfer fluid concentrate is sodium molybdate and/or sodium molybdate di-hydrate.

The concentration of molybdate ion may vary depending on the application. In some embodiments, one or more molybdate compounds present in a heat transfer fluid concentrate are soluble in the heat transfer fluid concentrate. In some embodiments, the molybdate compound is present in an amount from about 0 wt. % to about 10 wt. % (i.e., up to about 10 wt. %), in some embodiments about 0 wt. % to 5 wt. % (i.e., up to about 5 wt. %), in some embodiments, about 0 wt. % to 1 wt. % (i.e., up to about 1 wt. %) based on the total weight of the heat transfer fluid concentrate, and in some embodiments about 0.01 wt. % to 0.6 wt. % based on the total weight of the heat transfer fluid concentrate.

In some embodiments, heat transfer fluid concentrates in accordance with the present teachings may include one or a plurality of azole compounds. Representative azole compounds that may be used in accordance with the present teachings include but are not limited to benzotriazole, tolyltriazole, methyl benzotriazole (e.g., 4-methyl benzotriazole, 5-methyl benzotriazole), butyl benzotriazole, other alkyl benzotriazoles (e.g., alkyl group containing from 2 to 20 carbon atoms), mercaptobenzothiazole, thiazole, imidazole, benzimidazole, indazole, tetrazole, tetrahydrotolyltriazole, tetrahydrogenated benzotriazoles (e.g., 4,5,6,7-tetrahydrobenzotriazole),4-methyl-1H-benzotriazole, 5-methyl-1H-benzotriazole, tetrahydrobenzotriazole, and/or the like, and combinations thereof. In some embodiments, the azole compound used in a heat transfer fluid concentrate in accordance with the present teachings includes a benzotriazole, a tolyltriazole, or a combination thereof.

Azole compounds used in accordance with the present teachings may be substituted or unsubstituted. Representative substituted azole compounds include but are not limited to substituted thiazoles, substituted imidazoles, substituted indazoles, substituted tetrazoles, and/or the like, and combinations thereof.

The concentration of azole compound may vary depending on the application. In some embodiments, the amount of the azole compound ranges from about 0.01 wt. % to about 5 wt. % based on the total weight of the heat transfer fluid concentrate. Within this range, the azole compound may be present in an amount greater than or equal to about 0.05 wt. % and, in some embodiments, greater than or equal to about 0.1 wt. %. Also within this range, the azole compound may be present in an amount less than or equal to about 2 wt. % and, in some embodiments, less than or equal to about 1 wt. %.

In some embodiments, heat transfer fluid concentrates in accordance with the present teachings may include corrosion inhibitors for copper and copper alloys. Representative copper and copper alloy corrosion inhibitors include but are not limited to compounds containing a 5- or 6-membered heterocyclic ring as the active functional group, wherein the heterocyclic ring contains at least one nitrogen atom (e.g., an azole compound of a type described above). In some embodiments, a copper and copper alloy corrosion inhibitor includes a substituted or unsubstituted compound—and/or a salt thereof (e.g., a sodium or potassium salt)—selected from the group consisting of benzotriazole, a hydrobenzotriazole (e.g., tetrahydrobenzotriazole), tolyltriazole, a hydrotolyltriazole (e.g., 4-methyl-1H-benzontriazole, 5-methyl-1H-benzotriazole, and other tetrahydrobenzotriazoles as described in U.S. Pat. No. 8,236,205 B1), methyl benzotriazole (e.g., 4-methyl benzotriazole, 5-methyl benzotriazole), alkyl benzotriazoles (e.g., benzotriazoles having a $C_2$ to $C_{20}$ alkyl group, including but not limited to butyl benzotriazole), mercaptobenzothiazole, thiazole, imidazole, benzimidazole, indazole, tetrazole, and/or the like, and combinations thereof. In some embodiments, one or more of the aforementioned copper and copper alloy corrosion inhibitors may optionally be substituted. In some embodiments, the copper and copper alloy corrosion inhibitors may be present in the composition in an amount of about 0.01 wt. % to about 5 wt. %. In some embodiments, the amount of the copper and copper alloy corrosion inhibitor ranges from about 0.01 wt. % to about 4 wt. % based on the total weight of the heat transfer fluid concentrate. Within this range, the copper and copper alloy corrosion inhibitor may be present in an amount greater than or equal to about 0.05 wt. % and, in some embodiments, greater than or equal to about 0.1 wt. %. Also within this range, the copper and copper alloy corrosion inhibitor may be present in an amount less than or equal to about 2 wt. % and, in some embodiments, less than or equal to about 1 wt. %.

In some embodiments, heat transfer fluid concentrates in accordance with the present teachings may include a silicate. Silicates suitable for use in accordance with the present teachings include inorganic silicates and organic silicates. Useful inorganic silicates are represented by the general formula (2):

$$(MO)_m SiO_{(4-n/2)}(OH)_l \quad (2)$$

where M is a monovalent cation that forms a glycol or water-soluble silicate selected from the group consisting of sodium, potassium, lithium, rubidium, and tetraorganoammonium cations; "m" has a value of 1 to 4 inclusive; "l" has a value from 0 to 3 inclusive; and "n" has a value from 1 to 4 inclusive, and is equal to the sum of "m" and "l."

The concentration of silicates present in the heat transfer fluid concentrate may vary depending on the application. In some embodiments, the silicate may be present in the heat transfer fluid concentrate in an amount from about 0 ppm to about 8,000 ppm as Si (i.e., up to about 8,000 ppm), in some embodiments from about 0 ppm to about 2,000 ppm as Si (i.e., up to about 2,000 ppm), in some embodiments from about 0 ppm to about 1000 ppm (i.e., up to about 1,000 ppm) as Si, and in some embodiments less than about 700 ppm as Si in the heat transfer fluid concentrate.

Useful organic silicates include silicate esters represented by the general formula (3):

$$Si(OR)_4 \quad (3);$$

wherein R is selected from the group consisting of $C_1$ to $C_{36}$ alkyl, aryl, alkoxyalkyl, alkoxyaryl, hydroxyalkoxy, and mixtures thereof. In some embodiments, a tetraalkylorthosilicate ester with the alkyl groups containing 1 to 20 carbon atoms (e.g., tetramethylorthosilicate, tetraethylorthosilicate, and the like) may be used. The silicate ester is present in the heat transfer fluid concentrate formulation in an amount from about 0% to about 5% by weight (i.e., up to about 5 wt. %), for example about 0.01 to about 5% by weight, based on the total weight of the heat transfer fluid.

Colloidal silica may also be included for use as a corrosion inhibitor in accordance with the present teachings. The colloidal silica has a nominal particle size between about 1 nm and about 200 nm. In some embodiments, the colloidal silica particle size is about 1 nm to about 100 nm. In other embodiments, the colloidal silica particle diameter is between about 1 nm and about 40 nm. Suitable colloidal silicas for use in accordance with the present teachings include but are not limited to Ludox colloidal silica from DuPont or Grace Davidson, Nyacol and/or Bindzil colloidal silica from Akzo Nobel-Eka Chemicals, Snowtex colloidal silica from Nissan Chemical, as well as colloidal silica from Nalco and other suppliers. While neither desiring to be bound by any particular theory nor intending to limit in any measure the scope of the appended claims or their equivalents, it is presently believed that by using colloidal silica in a heat transfer fluid, the nanoparticles may increase heat transfer efficiency and/or heat capacity of the heat transfer fluids. In some embodiments, the colloidal silica is present in the formulation in an amount of about 0 ppm to about 20,000 ppm (i.e., up to about 20,000 ppm) and, in some embodiments, from about 0 ppm to about 2,000 ppm (i.e., up to about 2,000 ppm) of the heat transfer fluid concentrate.

In some embodiments, heat transfer fluid concentrates in accordance with the present teachings may include a silicate stabilizer. Representative silicate stabilizers for use in accordance with the present teachings include but are not limited to a silicate stabilizing organosilane compound. As used herein, the term "organosilane" refers to a silane (i.e., a monomeric silicon chemical) that contains at least one carbon-silicon bond (Si—C) structure. Silicate stabilizing organosilane compounds for use in accordance with the present teachings include but are not limited to sodium 3-(trihydroxysilyl)-propylmethylphosphonate (CAS no. 84962-98-1 or Q1-6083 silicone from Dow-Corning Corp. of Midland, Mich.); polyalkyleneoxidealoxysilane [e.g., methoxypolyethyleneoxypropyltrimethoxysilane having the formula: $CH_3O(CH_2CH_2O)_m C_3H_6Si(OCH_3)_3$, where m has an average value of 7.2, or methoxypolyethyleneoxypropyltripropoxylsilane having the formula $CH_3O(CH_2CH_2 O)_7 C_3H_6Si(OC_3H_7)_3$]; Silquest® Y-5560 or Silquest® Y-5630 from Momentive Performance Materials Inc. (Waterford, N.Y.); sodium salts of 3-(trihydroxylsilyl)-propyl ethoxyl phosphonate [e.g., $(HO)_3Si$—$C_3H_6$—$P(O)(ONa)(OC_2H_5)$]; one or more of the alkali metal siliconate silylalkylphosphonates described in U.S. Pat. No. 4,370,255; one or more of the arylalkyl silicone sulfonates described in EP Patent No. 0061694B1; one or more of the organosilane silicate stabilizers described in U.S. Pat. No. 4,629,602; one or more of the silicate stabilizers described in U.S. Pat. Nos. 3,337,496 and 3,341,469; and/or the like; and combinations thereof.

The concentration of silicate stabilizer may vary depending on the application. In some embodiments, the amount of the silicate stabilizer ranges from about 0 wt. % to about 5 wt. % (i.e., up to about 5 wt. %) based on the total weight of the heat transfer fluid concentrate. In some embodiments, the amount of silicate stabilizer present in the heat transfer fluid concentrate is proportional to the amount of silicate present in the heat transfer fluid concentrate, where the silicate:silicate-stabilizer ratio ranges from about 20:1 to about 1:10 by weight. In some embodiments, the silicate: silicate stabilizer ratio ranges from about 10:1 to about 1:2 by weight.

In some embodiments, the silicate component in the heat transfer fluid may be a copolymer of silicate and organosilane. Examples include but are not limited to phosphonate-silicate, sulfonate-silicate, carboxylate-silicate, and siloxane-silicate copolymers used in silicate-containing antifreeze/coolant compositions. These copolymers may be preformed or may be formed in situ by combining a water-soluble silicate and a water-soluble phosphonate silane, sulfonate silane, or carboxylate silane in an aqueous solution at ambient temperature. While neither desiring to be bound by any particular theory nor intending to limit in any measure the scope of the appended claims or their equivalents, it is presently believed that these copolymers may provide improved metal corrosion inhibition over the use of simple alkali metal silicates since the organosilane-silicate copolymers substantially inhibit the gelation tendency of water soluble silicate at a pH of between about 7 and about 11 in the glycol-water based antifreeze/coolant solutions.

Representative silicate-organosilane copolymers that may be used in accordance with the present teachings include but are not limited to those described in U.S. Pat. Nos. 3,198,820; 3,337,496; 3,341,496; 3,312,622; 3,248,329; 3,203,969; 4,093,641; 4,287,077; 4,333,843; 4,352,742; 4,354,002; 4,362,644; 4,434,065, 4,370,255; 4,629,602; 4,701,277; 4,772,408; and 4,965,344; European Patent No. 0,061,694 B1; and U.S. Patent Application Publication No. 2006/0017044A1.

Heat transfer fluid concentrates in accordance with the present teachings may include one or a plurality of water-soluble (polyelectrolyte) polymers. Illustrative examples of water-soluble polymers suitable for use in a heat transfer fluid concentrate in accordance with the present teachings include water-soluble polymers such as polyelectrolyte dispersants derived from a polymerizable monomer. The polymerizable monomer contains at least one group selected from the group consisting of unsaturated carboxylic acids or salts, unsaturated amides, unsaturated acid anhydrides, unsaturated nitriles, unsaturated carbonyl halides, unsaturated carboxylate esters, unsaturated ethers, unsaturated alcohols, unsaturated sulfonic acids or salts, unsaturated phosphonic acids or salts, unsaturated phosphinic acids or salts, and/or the like, and combinations thereof.

In some embodiments, water-soluble polymers suitable for use in a heat transfer fluid concentrate in accordance with the present teachings include homopolymers, copolymers, terpolymers, and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., acid chloride), acid anhydride, and/or the like, and combinations thereof. In some embodiments, a water-soluble polymer suitable for use in accordance with the present teachings may include at least 5% mer units of (1) or (2) and, in some embodiments, at least 10% mer units of (1) or (2).

Representative monocarboxylic acids suitable for use in making water-soluble polymers that may be used in a heat transfer fluid concentrate in accordance with the present teachings include but are not limited to acrylic acid, methacrylic acid, ethyl acrylic acid, vinylacetic acid, allylacetic acid, and crotonic acid.

Representative monocarboxylic acid esters suitable for use in making water-soluble polymers that may be used in a heat transfer fluid concentrate in accordance with the present teachings include but are not limited to butyl acrylate, n-hexyl acrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Representative dicarboxylic acids suitable for use in making water-soluble polymers that may be used in a heat transfer fluid concentrate in accordance with the present teachings include but are not limited to maleic acid, itaconic acid, fumaric acid, citaconic acid, mesaconic acid, and methylenemalonic acid.

Representative amides suitable for use in making water-soluble polymers that may be used in a heat transfer fluid concentrate in accordance with the present teachings include but are not limited to acrylamide (or 2-propenamide), methacrylamide, ethyl acrylamide, propyl acrylamide, N-t-butylacrylamide, tertiary butyl methacrylamide, tertiary octyl acrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide.

Representative anhydrides suitable for use in making water-soluble polymers that may be used in a heat transfer fluid concentrate in accordance with the present teachings include but are not limited to maleic anhydride (or 2, 5-furandione) and succinic anhydride.

Representative nitriles suitable for use in making water-soluble polymers that may be used in a heat transfer fluid concentrate in accordance with the present teachings include but are not limited to acrylonitrile and methacrylonitrile.

Representative acid halides suitable for use in making water-soluble polymers that may be used in a heat transfer fluid concentrate in accordance with the present teachings include but are not limited to acrylamidopropyltrimethylammonium chloride, diallyldimethylammonium chloride, and methacrylamidopropyltrimethylammonium chloride.

In some embodiments, a water-soluble polymer for use in a heat transfer fluid concentrate accordance with the present teachings contains at least one monomeric unit selected from the group consisting of allylhydroxypropylsulfonate, AMPS or 2-acrylamido-2-methylpropane sulfonic acid, polyethyleneglycol monomethacrylate, vinyl sulfonic acid, styrene sulfonic acid, acrylamidomethyl propane sulfonic acid, methallyl sulfonic acid, allyloxybenzenesulfonic acid, 1,2-dihydroxy-3-butene, allyl alcohol, allyl phosphonic acid, ethylene glycoldiacrylate, aspartic acid, hydroxamic acid, 2-ethyl-oxazoline, adipic acid, diethylenetriamine, ethylene oxide, propylene oxide, ammonia, ethylene diamine, dimethylamine, diallyl phthalate, 3-allyloxy-2-hydroxy propane sulfonic acid, polyethylene glycol monomethacrylate, sodium styrene sulfonate, an alkoxylated allyl alcohol sulfonate, and/or the like, and combinations thereof.

In some embodiments, the water-soluble polymer suitable for use in a heat transfer fluid concentrate in accordance with the present teachings contains at least 5 mole % of mer units (e.g., as polymerized units) resulting from the polymerization of one or more monomers selected from the group consisting of (a) acrylic acid, methacrylic acid, crotonic acid, vinyl acetic acid, 4-methyl-4 penenoic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy)propanesulfonic acid, allylsulfonic acid, other acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts of any of the foregoing; (b) methyl acrylate, ethyl acrylate, butyl acrylate, n-hexyl acrylate, methyl methacrylate, ethyl methacrylate, butyl methacrylate, isobutyl methacrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; (c) acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem, and carboxymethylacrylamide; (d) maleic anhydride (or 2, 5-furandione) and succinic anhydride; acrylonitrile, and methacrylonitrile; (e) acrylamidopropyltrimethylammonium chloride, diallyldimethylammonium chloride, and methacrylamidopropyltrimethylammonium chloride; (f) 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, and an alkoxylated allyl alcohol sulfonate; and (g) combinations thereof.

In some embodiments, a representative alkoxylated allyl alcohol sulfonate monomer for use in preparing a water-soluble polymer in accordance with the present teachings has the structure shown in general formula (4):

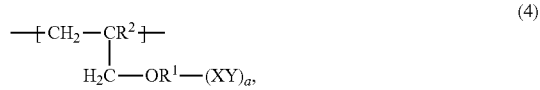

(4)

wherein $R^1$ is a hydroxyl substituted alkyl or alkylene radical having 1 to about 10 carbon atoms, or $R^1$ is a non-substituted alkyl or alkylene radical having 1 to about 10 carbon atoms, or $R^1$ is —$(CH_2—CH_2—O)_n$—, —$[CH_2—CH(CH_3)—O]_n$—, or combination thereof; wherein "n" is an integer from about 1 to about 50; wherein $R^2$ is H or a lower alkyl ($C_1$-$C_3$) group; wherein X, when present, is an anionic radical selected from the group consisting of —$SO_3$, —$PO_3$, —$PO_4$, and —$COO$; wherein Y, when present, is H or any water-soluble cation or cations which together counterbalance the valance of the anionic radical; and wherein a is 0 or 1. In some embodiments, a=1.

Representative water-soluble polyelectrolyte polymers suitable for use in a heat transfer fluid concentrate in accordance with the present teachings may, in some embodiments, have a molecular weight (MW) ranging from about 200 Daltons to about 200,000 Daltons. In other embodiments, suitable water-soluble polyelectrolyte polymer dispersants have a molecular weight (MW) ranging from about 500 Daltons to about 20,000 Daltons.

Illustrative water-soluble polyelectrolyte polymers suitable for use in a heat transfer fluid concentrate in accordance with the present teachings include but are not limited to polycarboxylates. Representative polycarboxylates include but are not limited to (1) polyacrylic acids or polyacrylates, acrylate-based polymers, copolymers, terpolymers, and quad-polymers such as acrylate/acrylamide copolymers, acrylate/AMPS (acrylamido methylene sulfonic acid or 2-acrylamido-2-methyl-1-propanesulfonic acid) or acrylamidoalkane sulfonic acid copolymers, acrylate/sulfonate copolymers, acrylate/hydroxyalkyl acrylate copolymers, acrylate/alkyl acrylate copolymers, acrylate/AMPS/alkyl acrylamide terpolymers, acrylate/acrylamidoalkane sulfonic acid/styrene sulfonic acid (or water-soluble salts) terpolymers, acrylate/acrylamide/sulfoalkylacrylamide terpolymers, acrylic acid/allyloxy-2-hydroxypropylsulfonic acid (AHPSE)/polyethyleneglycol allyl ether terpolymer, acrylate/methacrylate methyl ester/2-propane-1-sulfonic acid, 2-methyl-, sodium salt/bezenesulfonic acid, 4-[(2-methyl-2-propenyl)oxy]-, sodium salt quad-polymers; (2) polymethacrylic acids or polymethacrylates, methacrylate-based polymers, copolymers, terpolymers, and quad-polymers, where one monomer of the corresponding acrylate-based polymers listed in (1) is replaced by methacrylate or methacrylic acid; (3) polymaleic acid or maleic anhydride polymers, maleic acid based polymers, their copolymers, terpolymers and quad-polymers, where one monomer of the corresponding acrylate-based polymers listed in (1) is replaced by maleic acid or maleic anhydride; (4) polyacrylamides, modified acrylamide-based polymers, and acrylamide-based copolymers, terpolymers and quad-polymers, where one monomer of the corresponding acrylate-based polymers listed in (1) is replaced by acrylamide; (5) sulfonic acid-based copolymers, terpolymers and quad-polymers or their water-soluble salts; phosphonic acid-based copolymers, terpolymers and quad-polymers or their water-soluble salts; phosphinic acid-based copolymers, terpolymers and quad-polymers or their water-soluble salts; (6) vinylpyrrolidone-based homopolymers, and copolymers; (7) alkylene oxide-based copolymers and terpolymers; and combinations comprising one or more of the foregoing.

A water-soluble polymer for use in a heat transfer fluid concentrate in accordance with the present teachings may also be either a polyether polyamino methylene phosphonate as described in U.S. Pat. No. 5,338,477 or a phosphino polyacrylate acid.

Representative examples of commercially available polymers suitable for use as water-soluble polyelectrolyte polymers in a heat transfer fluid concentrate in accordance with the present teachings include but are not limited to (a) the Good-Rite® K-700 series of polymers shown in Table 1 available from Noveon (or Lubrizol), (b) the polymers shown in Table 2 available from AkzoNobel, and (c) the polymers shown in Table 3 available from Dow (Rohm & Haas).

Polymers supplied by Noveon (or Lubrizol) that may be used as a water soluble polyelectrolyte polymer in the heat transfer fluid concentrate include those shown in Table 1 below.

TABLE 1

Polymers supplied by Noveon (or Lubrizol): Good-Rite ® K-700 series polymers.

| Good-Rite ® Polymer Technical Data Sheet | Chemical Type | Nominal Molecular Weight | pH | Total Solids | Active Solids |
|---|---|---|---|---|---|
| K-702 | PAA | 240,000 | 2.5 | 25% | 24.70% |
| K-7028 | PAA | 2,000 | 3.6 | 55% | 51.70% |
| K-7058 | PAA | 5,000 | 2.5 | 50% | 49.20% |
| K-7058N | NaPAA | 5,000 | 7 | 45% | 35.70% |
| K-7058D | NaPAA | 5,000 | 7.5* | 100%** | 70% |
| K-7600N | NaPAA | 60,000 | 8.2 | 33% | 25.70% |
| K-732 | PAA | 5,000 | 2.6 | 50% | 49.50% |
| K-739 | NaPAA | 5,000 | 7.5* | 100%** | 70.10% |
| K-752 | PAA | 2,000 | 2.6 | 63% | 62.20% |
| K-759 | NaPAA | 2,000 | 7.5* | 100%** | 71.50% |
| K-765 | NaPMAA | 30,000 | 7 | 30% | 24.30% |
| K-766 | NaPMAA | 5,000 | 7 | 40% | 30.10% |

TABLE 1-continued

Polymers supplied by Noveon (or Lubrizol): Good-Rite ® K-700 series polymers.

| Good-Rite ® Polymer Technical Data Sheet | Chemical Type | Nominal Molecular Weight | pH | Total Solids | Active Solids |
|---|---|---|---|---|---|
| K-776 | AA/SA | N.P. | 4.8 | 37% | 30.60% |
| K-775 | AA/SA | N.P. | 3.5 | 50% | 48% |
| K-781 | AA/SA/SS | N.P. | 2.8 | 55% | 52.80% |
| K-797 | AA/SA/SS | N.P. | 2.7 | 50% | 48.50% |
| K-797D | Na(AA/SA/SS) | N.P. | 8.2* | 100%** | 74.30% |
| K-798 | AA/SA/SS | N.P. | 2.8 | 50% | 48% |
| K-XP212 | Proprietary | N.P. | 4 | 40% | 39.20% |

PAA = Polyacrylate,
NaPAA = Sodium Polyacrylate,
NaPMAA = Sodium Polymethacrylate
AA = Acrylic Acid,
SA = Sulfonic Acid or AMPS,
SS = Sodium Styrene Sulfonate
'Active Solids' = 'Total Solids' − 'Counter Ions' (sodium) from post polymerization neutralization with NaOH
*pH of a 1% solution
**Includes moisture content
N.P. Not published Polymers supplied by AkzoNobel that may be used as a water soluble polyelectrolyte polymer in the heat transfer fluid concentrate include those shown in Table 2 below.

TABLE 2

AkzoNobel Aquatreat Industrial Water Treatment Products Typical Property.

| Product | Total Solids | pH | MW |
|---|---|---|---|
| Polyacrylic Acid | | | |
| AR-4 | 25 | 2.1 | 60000 |
| AR-6 | 25 | 2.3 | 100000 |
| AR-260 | 50 | 3.2 | 2000 |
| AR-602A | 50 | 2.8 | 4500 |
| AR-900A[1] | 50 | 2.9 | 2600 |
| AR-921A | 50 | 2.6 | 3000 |
| AR-935 | 35 | 3.5 | 2500 |
| Sodium Polyacrylate | | | |
| AR-602N[1] | 45 | 7.5 | 4500 |
| AR-636 | 45 | 7.5 | 5000 |
| AR-900[1] | 33 | 5.5 | 2600 |
| AR-940[1] | 40 | 8.3 | 2600 |
| Sodium Polymethacrylate | | | |
| AR-231[1] | 30 | 8.5 | 6500 |
| AR-232[1] | 30 | 8.5 | 9500 |
| AR-241 | 40 | 7 | 6500 |
| Copolymer | | | |
| AR-335 | 49 | 7.2 | 3400 |
| AR-540[1] | 44 | 4.3 | 10000 |
| AR-545 | 44 | 4.4 | 5000 |
| AR-546 | 37 | 4.8 | 9900 min |
| AR-978 | 42 | 5 | 4500 |
| AR-980[1] | 41 | 6.4 | 2800 |
| Sulfonated Styrene Maleic Anhydride | | | |
| VERSA-TL 3 | 95 | 7 | 20000 |
| VERSA-TL 4 | 25 | 7 | 20000 |

AR-335 is polyacrylamide; AR-545 and AR-546 are AA/AMPS copolymers; Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer. Versa TL-4=sulfonated styrene/maleic anhydride copolymer. Versa TL-3 is the dry form of Versa TL-4. AR-978 is acrylic acid/maleic acid copolymer. AR-980 is an acrylic acid/maleic acid/Nonionic monomer terpolymer.

Polymers supplied by Dow (Rohm & Haas) that may be used as a water soluble polyelectrolyte polymer in the heat transfer fluid concentrate include those shown in Table 3 below.

TABLE 3

Polymers available from Dow (Rohm & Haas).

| Product Name | Chemical Nature | Molecular Weight | % Solids | pH |
|---|---|---|---|---|
| Acumer ® 1000/Optidose ™ 1000 | Polyacrylic acid and its Na salts | 2,000 | 47-49 | 3.2-4.0 |
| Acumer ® 1020 | Polyacrylic acid | 2,000 | 39-41 | 2.1-2.5 |
| Acumer ® 1100 | Polyacrylic acid and its Na salts | 4,500 | 47-49 | 3.2-4.0 |
| Acumer ® 1110 | Polyacrylic acid and its Na salts | 4,500 | 44-46 | 6.7 |
| Acumer ® 1050 | Polyacrylic acid and its Na salts | 2,000-2,300 | 47-49 | 3.2-4.0 |
| Acumer ® 1510 | Na Salt of Polycarboxylate | 60,000 | 24-26 | 2 |
| Acumer ® 1808 | Na Salt of Polycarboxylate | 30,000 | 21-22 | 3.5-5.0 |
| Acumer ® 1850 | Na Salt of Polycarboxylate | 30,000 | 29-31 | 9.0-10.8 |
| Acumer ® 2000/Optidose ™ 2000 | Modified Polycarboxylate | 4,500 | 42.5-43.5 | 3.8-4.6 |
| Acumer ® 2100 | Copolymer | 11,000 | 36.5-37.5 | 4.3-5.3 |
| Acumer ® 3100/Optidose ™ 3100 | Carboxylate/Sulfonate/Nonionic Terpolymer | 4,500 | 43-44 | 2.1-2.6 |
| Acumer ® 4161 | Phosphinopolycarboxylic Acid | 3,300-3,900 | 46-48 | 3.0-3.5 |
| Optidose ™ 4210 | Polymaleic Acid | 500-1,000 | 50 | 1.0-2.0 |
| Acumer ® 5000 | Proprietary Polymer | 5,000 | 44.5-45.5 | 2.1-2.6 |
| Tamol ® 850 | Na Salt of Polycarboxylate | 30,000 | 29-31 | 9.0-10.8 |
| Tamol ® 731A | Maleic Anhydride Na Salt Copolymer | 15,000 | 24-26 | 9.5-10.5 |
| Tamol ® 960 | Na Salt of Polycarboxylate | 5,000 | 39-41 | 8-9 |

Note: Acumer 2000 and 2100 are carboxylic acid/sulfonic acid copolymers (i.e., AA/AMPS copolymers); Acumer 3100 and Acumer 5000 are acrylic acid/t-butyl acrylamide/2-acrylamido-2-methyl propane sulfonic acid terpolymers. Optidose 1000, 2000 and Optidose 3100 are tagged versions of Acumer 1000, 2000, and 3100, respectively.

In some embodiments, a water-soluble polymer suitable for use in a heat transfer fluid concentrate in accordance with the present teachings is selected from the following commercially-available polymers: (1) polymers available from BASF under the SOKALAN and TAMOL brands, including but not limited to Sokalan CP 9 (maleic acid based polymer), Sokalan CP 10, CP 42, 10S, 12S (all are acrylate-based polymers), 13S, Sokalan HP 22 G, HP 25, HP 59 and HP165 (polyvinylpyrrolidone), Solakan PA 15, PA 20, PA 25 Cl, PA 30 Cl, PA 40, Sokalan PM 10 I, PM 70, Tamol VS, and other similar products; (2) polymers available from Cytec under the CYANAMER brand including but not limited to P-35, P-70, P-80, A-100 L and A-15 (all are acrylate- or acrylamide-based polymers or copolymers) and the like; (3) polymers available from Biolab additives under the BLECLENE and BELSPERSE brands, including but not limited to Beclene 200 (maleic acid homopolymer), 283 (maleic acid terpolymer), 400 (sulfonated phosphino polycarboxylic acid) and 499 (sulfonated phosphono polycarboxylic acid); and Belsperse 161 (phosphino polycarboxylic acid) and 164 (phosphino polycarboxylic acid), and the like and (4) water-soluble polymeric products available from Nalco (e.g., acrylic acid/2-acrylamido-2-methylpropyl sulfonic acid copolymers, polyether polyamino phosphonate as described in U.S. Pat. No. 5,338,477, and acrylic acid/acrylamide/acrylamidomethanesulfonic acid terpolymers), GE Betz (e.g., acrylic acid/polyethyleneglycol allyl ether copolymers, acrylic acid/allyloxy-2-hydroxypropylsulfonic acid (or AHPSE)/polyethyleneglycol allyl ether terpolymers, and acrylic acid/AHPSE copolymers), Chemtreat [e.g., allyoxybenzenesulfonic acid (~3.5 mole %)/methallyl sulfonic acid (~2.5 mole %)/methyl methacrylate (13-18 mole %)/acrylic acid (76-81 mole %) quad-polymers], Ciba, SNF Floerger, Rhone-Poulenc, Stockhausen, Hercules, Henkel, Allied Colloids, Hoechst Celanese, Ashland Chemical Company, Kurita Water Industries Ltd, Nippon Shokubai Co., and other suppliers.

Additional water-soluble polymers that may be used in a heat transfer fluid concentrate in accordance with the present teachings include but are not limited to those described in the following U.S. Pat. Nos. 3,085,916; 3,578,589; 3,709,815; 3,806,367; 4,499,002; 4,510,059; 4,532,048; 4,563,284; 4,566,973; 4,566,974; 4,640,793; 4,707,271; 4,762,621; 4,784,774; 4,885,097; 4,952,326; 4,952,327; 5,023,001; 5,658,465; 6,361,768B1; 4,556,493; 4,581,145; 4,457,847; 4,703,092; 4,801,388; 4,919,821; 4,929,425; 5,035,806; 5,049,310; 5,080,801; 5,128,419; 5,167,828; 5,171,459; 5,213,691; 5,216,086; 5,260,386; 5,422,408; 5,403,493; 5,534,611; 5,726,267; 5,736,405; 5,776,875; 5,750,070; 5,788,866; 5,858,244; 5,876,623; 6,005,040; 6,017,994; 6,022,401; 6,153,106; 6,225,430B1; 6,232,419B1; 6,312,644B1; 6,344,531B1; 6,380,431B1; 6,426,383B1; 6,440,327B1; 6,461,518B1; 6,645,428B1; 7,115,254B1; 4,443,340; 4,659,480; 4,659,482; 4,913,822; 4,929,362; 4,929,695; 4,931,206; 4,944,885; 5,030,748; 5,078,891; 5,100,558; 5,102,555; 5,108,619; 5,128,427; 5,139,643; 5,147,555; 5,158,622; 5,158,685; 5,169,537; 5,180,498; 5,194,620; 5,211,845; 5,234,604; 5,248,438; 5,242,599; 5,256,302; 5,264,155; 5,271,847; 5,271,862; 5,282,905; 5,320,757; 5,332,505; 5,342,540; 5,350,536; 5,374,336; 5,378,327; 5,378,372; 5,393,456; 5,445,758; 5,512,183; 5,518,630; 5,527,468; 5,575,920; 5,601,754; 6,228,950B1; 6,444,747B1; 6,641,754B2; 4,517,098; 4,530,766; 4,711,725; 5,055,540; 5,071,895; 5,185,412; 5,223,592; 5,277,823; 5,342,787; 5,395,905; 5,401,807; 5,420,211; 5,451,644; 5,457,176; 5,516,432; 5,531,934; 5,552,514; 5,554,721; 5,556,938; 5,597,509; 5,601,723; 5,658,464; 5,755,972; 5,866,664; 5,929,098; 6,114,294; 6,197,522B1; 6,207,780B1; 6,218,491B1; 6,251,680B1; 6,335,404B1; 6,395,185; 5,023,368; 5,547,612; 5,650,473; 5,654,198; 5,698,512; 5,789,511; 5,866,012; 5,886,076; 5,925,610; 6,040,406; 6,995,120B2; 7,087,189B2; 5,346,626; 5,624,995; 5,635,575; 5,716,529; 5,948,268; 6,001,264; 6,162,391; 6,368,552B1; 6,656,365B2; 6,645,384B1; 5,000,856; 5,078,879; 5,087,376; 5,124,046; 5,153,390; 5,262,061; 5,322,636; 5,338,477; 5,378,368; 5,391,303; 5,407,583; 5,454,954; 5,534,157; 5,707,529; 6,691,715B2; 6,869,998B2; 4,372,870; 5,124,047; 4,797,224; 4,485,223; 5,254,286; 4,460,477; 5,015,390; 4,933,090; 4,868,263; 4,895,664; 4,895,916; 5,000,856; 4,900,451; 4,584,105; 4,872,995; 4,711,726; 4,851,490; 4,849,129; 4,589,985; 4,847,410; 4,657,679; 4,801,387; 4,889,637; 4,604,211; 4,710,303; 4,589,985; 4,324,664; 3,752,760; 4,740,314; 4,647,381; 4,836,933; 4,814,406; 4,326,980; 4,008,164; 5,246,332; and 5,187,238. Additional water-soluble polymers that may be used in a heat transfer fluid concentrate in accordance with the present teachings include but are not limited to those described in the following European patents: EP 0,297,049B1; EP 0360746B1; and EP 0,879,794B1. Additional water-soluble polymers that may be used in a heat transfer fluid concentrate in accordance with the present teachings include but are not limited to those described in the following U.S. patent application publications: 2006/0191852A1; 2005/0202995A1; 2002/0195583A1; 2004/00225093A1; 2005/0009959A1; and 2005/0092211A1.

In some embodiments, the water-soluble polymer used in a heat transfer fluid concentrate in accordance with the present teachings includes an acrylate-based polymer. Representative acrylate-based polymers suitable for use in accordance with the present teachings include but are not limited to acrylate-based homopolymer, acrylate-based copolymer, acrylate-based terpolymer, acrylate-based quad-polymer, and combinations thereof. In some embodiments, the acrylate-based polymer comprises polyacrylate.

For some of the embodiments in which a heat transfer fluid concentrate in accordance with the present teachings further includes magnesium ions and the water-soluble polymer includes an acrylate-based polymer, the ratio of active acrylate-based polymer stabilizer concentration to magnesium ion concentration is between about 1 and about 25 and, in other embodiments is optionally greater than about 5 and less than about 25. For some of the embodiments in which a heat transfer fluid concentrate in accordance with the present teachings further includes calcium ions and the water-soluble polymer includes an acrylate-based polymer, the ratio of active acrylate-based polymer concentration to calcium ion concentration in the heat transfer fluid concentrate is greater than 4 and less than about 110. In some embodiments, the ratio of active acrylate-based polymer concentration to calcium ion concentration in the heat transfer fluid concentrates is greater than about 7 and less than about 80.

In some embodiments, heat transfer fluid concentrates in accordance with the present teachings may optionally further include one or a plurality of phosphonocarboxylates. Phosphonocarboxylates are phosphonated compounds having the general formula (5)

$$H[CHRCHR]_n-PO_3M_2 \qquad (5)$$

wherein at least one R group in each unit is a COOM, $CH_2OH$, sulphono or phosphono group, and the other R group—which may be the same as or different than the first R group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is 1 or an integer greater than 1; and wherein each M is hydrogen or an alkali metal ion such as a sodium ion, potassium ion and the like. Furthermore, at least one COOM group will be present in one of the R groups. In some embodiments, the phosphonocarboxylates are phosphonated oligomers or mixture of phosphonated oligomers of maleic acid of the formula (6)

$$H[CH(COOM)CH(COOM)]_n-PO_3M_2 \qquad (6)$$

wherein n is 1 or an integer greater than 1, and M is a cationic species (e.g., alkali metal cations) such that the compound is water-soluble. Representative phosphonocarboxylates include but are not limited to phosphonosuccinic acid, 1-phosphono-1,2,3,4-tetracarboxybutane, and 1-phosphono-1,2,3,4,5,6-hexacarboxyhexane. The phosphonocarboxylates may be a mixture of compounds having the formula (6) with differing values for "n". The mean value of "n" may be 1 to 2 or, in some embodiments, 1.3 to 1.5. The synthesis of the phosphonocarboxylates is known and described in U.S. Pat. No. 5,606,105. The phosphonocarboxylates are separate and different from the carboxylates described above.

In a heat transfer fluid concentrate in accordance with the present teachings, a phosphonocarboxylate may optionally be present in an amount ranging from about 10 ppm to about 500 ppm based on the total weight of the heat transfer fluid concentrate. Within this range, the phosphonocarboxylate may be present in an amount greater than or equal to about 20 ppm and, in some embodiments, greater than or equal to about 40 ppm. Also within this range, the phosphonocarboxylate may be present in an amount less than or equal to about 400 ppm and, in some embodiments, less than or equal to about 300 ppm. In some embodiments, a heat transfer fluid concentrate in accordance with the present teachings is free of any phosphonocarboxylate.

In some embodiments, heat transfer fluid concentrates in accordance with the present teachings may optionally further include one or a plurality of phosphinocarboxylates. Phosphinocarboxylates are compounds having the general formula (7)

$$H[CHR^1CHR^1]_n-P(O_2M)-[CHR^2CHR^2]_mH \qquad (7)$$

wherein at least one $R^1$ group in each unit is a COOM, $CH_2OH$, sulphono or phosphono group and the other $R^1$ group—which may be the same as or different than the first $R^1$ group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is an integer equal to or greater than 1; and wherein each M is hydrogen or an alkali metal ion such as a sodium ion, potassium ion, and the like. Similarly, at least one $R^2$ group in each unit is a COOM, $CH_2OH$, sulphono or phosphono group and the other $R^2$ group—which may be the same as or different than the first $R^2$ group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; and wherein m is an integer equal to or greater than 0. Furthermore, at least one COOM group will be present in one of the $R^1$ and $R^2$ groups. Representative phosphinocarboxylates include but are not limited to phosphinicosuccinic acid and water-soluble salts thereof, phosphinicobis(succinic acid) and water-soluble salts thereof, and phosphinicosuccinic acid oligomer and salts thereof as described in U.S. Pat. Nos. 6,572,789 and 5,018,577. The phosphonocarboxylates may be a mixture of compounds having the formula (6) with differing values for "n" and "m". The phosphinocarboxylates are separate and different from the carboxylates described above.

In a heat transfer fluid concentrate in accordance with the present teachings, a phosphinocarboxylate may optionally be present in an amount ranging from about 10 ppm to about 500 ppm based on the total weight of the heat transfer fluid concentrate. Within this range, the phosphinocarboxylate may be present in an amount greater than or equal to about 20 ppm and, in some embodiments, greater than or equal to about 40 ppm. Also within this range, the phosphinocarboxylate may be present in an amount less than or equal to about 400 ppm and, in some embodiments, less than or equal to about 300 ppm. In some embodiments, a heat transfer fluid concentrate in accordance with the present teachings is free of any phosphinocarboxylate.

In some embodiments, heat transfer fluid concentrate in accordance with the present teachings may optionally further include one or more additional components. The combined total concentration of the optional additional components may range from about 0.0 wt. % to about 15 wt. % (i.e., up to about 15 wt. %) based on the total weight of the heat transfer fluid concentrate. In some embodiments, the combined total concentration of the optional additional components is between about 0.0001 wt. % and about 10 wt. % based on the total weight of the heat transfer fluid concentrate. In other embodiments, the combined total concentration of the optional additional components is between about 0.001 wt. % and about 5 wt. % based on the total weight of the heat transfer fluid concentrate. In further embodiments, the combined total concentration of the optional additional components is between about 0.01 wt. % and about 3 wt. % based on the total weight of the heat transfer fluid concentrate.

Representative additional components that may optionally be present in a heat transfer fluid concentrate in accordance with the present teachings include but not limited to colorants, antifoaming agents or defoamers, pH-adjusting agents, phosphonates (e.g., AMP or aminotrimethylene phosphonic acid; HEDP or 1-hydroxy ethylidene-1,1-diphosphonic acid; HPA or hydroxyphosphono-acetic acid or 2-hydroxy phosphono acetic acid; PBTC or 2-butane phosphono-1,2,4-tricarboxylic acid; PCAM or phosphono carboxylate acid mixture; and/or Bricorr 288, which is a mixture of sodium salts of organophosphonic acid $H-[CH(COONa)CH(COONa)]_n-PO_3Na_2$, where n<5 and $n_{mean}$=1.4 and other phosphonates), phosphinates (e.g., PSO or phosphinic acid oligomers, which is a mixture of mono-, bis-, and oligomeric phosphinosuccinic acid adduct, and other phosphinates), biocides, polymer dispersants, scale inhibitors, surfactants, bittering agents, additional corrosion inhibitors, other coolant/antifreeze additives, and/or the like, and combinations thereof. In some embodiments, a heat transfer fluid concentrate in accordance with the present teachings may specifically exclude one or more of these optional additional components (e.g., be substantially "free" of one or more of the aforementioned additional components).

Additional corrosion inhibitors that optionally may be included in a heat transfer fluid concentrate in accordance with the present teachings include but are not limited to salts of cyclohexenoic carboxylate compounds derived from tall oil fatty acids (e.g., alkali metal salts, ammonium salts, and/or the like) as well as amine compounds. Representative amine compounds include but are not limited to ethanolamine, diethanolamine, triethanolamine, morpholine, benzylamine, cyclohexylamine, dicyclohexylamine, hexylamine, AMP (2-amino-2-methyl-1-propanol or isobutanolamine), DEAE (diethylethanolamine), DEHA (diethylhydroxylamine), DMAE (2-dimethylaminoethanol), DMAP (dimethylamino-2-propanol), MOPA (3-methoxypropylamine), and/or the like, and combinations thereof.

Representative colorants or dyes suitable for use in a heat transfer fluid concentrate in accordance with the present teachings include but are not limited to "Uranine Yellow," "Uranine Dye," "Alizarine Green," "Chromatint Orange 1735" or "Green AGS liquid" from Abbeys Color Inc., or Chromatech Incorporated, "Chromatint Yellow 0963 Liquid Dye," "Chromatint Yellow 2741 Liquid Dye," "Chromatint Green 1572 dye," "Chromatint Green 2384 Dye," "Chromatint Violet 1579 Dye" from Chromatech Incorporated, "Acid Red #52" or Sulforhodamine B from Tokyo Chemical Industry Co. or TCI America, "Orange II (acid Orange 7)" or "Intracid Rhodamine WT (Acid Red 388) from Sensient Technologies or other suppliers.

Any suitable antifoaming agent or defoamer, including but not limited to conventionally known such agents, may be used in heat transfer fluids in accordance with the present teachings. Representative defoamers that may be used in a heat transfer fluid concentrate in accordance with the present teachings include but are not limited to an organo-modified polydimethylsiloxane-containing polyalkylene glycol, siloxane polyalkylene oxide copolymer, polyalkylene oxide, "PM-5150" available from Prestone Products Corp., "Pluronic L-61" and "Plurafac® LF 224 from BASF Corp., "Patcote 492", "Patcote 415" and other Patcote-branded antifoam available from Hydrite Chemical Co. and other suppliers, and "Foam Ban 136B" and other Foam Ban antifoams available from Munzing Chemie GmbH or affiliated companies. The optional antifoam agents may also include polydimethylsiloxane emulsion-based antifoams, including but not limited to PC-5450NF from Performance Chemicals, LLC in Boscawen, N.H.; and CNC antifoam XD-55 NF and XD-56 from CNC International in Woonsocket in RI. In some embodiments, the optional antifoam agents may include a silicone or organo-modified polydimethylsiloxane, for example, SAG brand of silicone-based antifoams (e.g., SAG-10, Silbreak® 320) from OSI Specialties Inc., Momentive Performance Materials Inc. in Waterford, N.Y., Dow Corning and other suppliers; an ethylene oxide-propylene oxide (EO-PO) block copolymer and a propylene oxide-ethylene oxide-propylene oxide (PO-EO-PO) block copolymer (e.g., Pluronic L61, Pluronic L81, and other Pluronic and Pluronic C products); poly(ethylene oxide) or poly(propylene oxide), for example, PPG 2000 (e.g., polypropylene oxide with an average molecular weight of 2000 Daltons); polydiorganosiloxane-based products (e.g., products containing polydimethylsiloxane (PDMS), and the like); fatty acids or fatty acid esters (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene, and an aromatic oil; and/or the like; and combinations thereof.

Representative biocides suitable for use in a heat transfer fluid concentrate in accordance with the present teachings include but are not limited to various non-oxidizing biocides, such as glutaraldehyde, isothiazolin, 5-chloro-2-methyl-4-isothiazolin-3-one, 2-methyl-4-isothiazolin-3-one, 1,2-benzisothiazolin-3-one, 2,2-dibromo-3-nitrilopropionamide, 2-bromo-2-nitropropane-1,3-diol, methylene bis(thiocyanate), terbuthylazine, tetrakis(hydroxymethyl) phosphonium sulphate, and/or the like, and combinations thereof.

Representative pH-adjusting agents suitable for use in a heat transfer fluid concentrate in accordance with the present teachings include but are not limited to alkali or alkaline earth metal hydroxides or oxides (e.g., sodium hydroxide, potassium hydroxide), inorganic phosphates (e.g., sodium phosphate, potassium phosphate, sodium pyrophosphate, and potassium pyrophosphate), and/or the like, and combinations thereof.

Representative non-ionic surfactants suitable for use in a heat transfer fluid concentrate in accordance with the present teachings include but are not limited to fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and/or the like, and combinations thereof. In some embodiments, the average molecular weight of the non-ionic surfactants is between about 55 and about 300,000 and, in some embodiments, between about 110 and about 10,000. Representative sorbitan fatty acid esters include but are not limited to sorbitan monolaurate (e.g., sold under the tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), and sorbitan monotallate (e.g., S-MAZ® 90). Representative polyalkylene glycols include but are not limited to polyethylene glycols, polypropylene glycols, and combinations thereof. Representative polyethylene glycols include but are not limited to CARBOWAX™ polyethylene glycols and methoxypolyethylene glycols from Dow Chemical Company (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Representative polyalkylene glycol esters include but are not limited to mono- and di-esters of various fatty acids, such as MAPEG® polyethylene glycol esters from BASF (e.g., MAPEG® 200 ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Representative copolymers of ethylene oxide (EO) and propylene oxide (PO) include but are not limited to various Pluronic and Pluronic R block copolymer surfactants from BASF, DOWFAX non-ionic surfactants, UCON™ fluids and SYNALOX lubricants from DOW Chemical. Representative polyoxyalkylene derivatives of a sorbitan fatty acid ester include but are not limited to polyoxyethylene 20 sorbitan monolaurate (e.g., products sold under the tradenames TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K), and/or the like, and combinations thereof.

In some embodiments, heat transfer fluid concentrates in accordance with the present teachings may be used in cooling systems and may provide corrosion inhibition properties. In some embodiments, a heat transfer fluid concentrate in accordance with the present teachings contains (a) a freezing point depressant, water, or a combination thereof, wherein the freezing point depressant is present in an amount ranging from about 1 wt. % to about 99% wt. % based on a total weight of the heat transfer fluid concentrate; (b) an organophosphate, wherein the organophosphate is present in an amount ranging from about 0.002 wt. % to about 5 wt. % based on the total weight of the heat transfer fluid concentrate; (c) a carboxylic acid or a salt thereof, wherein the carboxylic acid or the salt thereof is present in an amount ranging from about 1 wt. % to about 10 wt. % based on the total weight of the heat transfer fluid concentrate, wherein the carboxylic acid includes one or a plurality of $C_6$ to $C_{20}$ carboxylic acids, and wherein the one or the plurality of $C_6$ to $C_{20}$ carboxylic acids is individually selected from the group consisting of an aliphatic mono-carboxylic acid, an aliphatic di-carboxylic acid, an aromatic mono-carboxylic acid, an aromatic di-carboxylic acid, and combinations thereof; (d) calcium ion in a concentration up to about 200 mg/L based on a total weight of the heat transfer fluid concentrate; (e) magnesium ion in a concentration up to about 150 mg/L based on a total weight of the heat transfer fluid concentrate; (f) an azole compound present in an amount ranging from about 0.01 wt. % to about 3 wt. % based on the total weight of the heat transfer fluid concentrate; and (g) optionally, an additional component selected from the group consisting of an inorganic phosphate, lithium ion, zinc ion, nitrate ion, nitrite ion, molybdate ion, a phosphonate, a phosphinate, an acrylate-based polymer, a colorant, a biocide, an antifoam, a surfactant, a dispersant, an antiscalant, a wetting agent, and combinations thereof. In some embodiments, the heat transfer fluid concentrate contains the calcium ions in a concentration ranging from about 0.001 mg/L to about 200 mg/L based on a total weight of the heat transfer fluid concentrate and/or contains the magnesium ions in a concentration ranging from about 0.001 mg/L to about 150 mg/L based on a total weight of the heat transfer fluid concentrate.

In some embodiments, a heat transfer fluid concentrate in accordance with the present teachings is a single-phase, homogeneous solution at room temperature. In some embodiments, a heat transfer fluid concentrate in accordance with the present teachings is storage stable at a temperature between about −10° C. and +100° C. In some embodiments, a heat transfer fluid concentrate and/or a ready-to-use heat transfer fluid derived therefrom (e.g., by dilution) will meet the properties and performance requirements of ASTM D3306.

In some embodiments, a heat transfer fluid concentrate in accordance with the present teachings may be diluted (e.g., with water) to form a heat transfer fluid. For example, in some embodiments, the heat transfer fluid concentrate may be diluted by about 10 vol. % to about 75 vol. % to form a heat transfer fluid. In some embodiments, the water used for dilution is deionized water as described in Section 4.5 of ASTM D3306-10.

In some embodiments, heat transfer fluid concentrate in accordance with the present teachings may be provided as a commercially available product. In other embodiments, a ready-to-use heat transfer fluid in which the heat transfer fluid concentrate has been pre-diluted to around 50 vol. % with water may be provided as a commercially available product. In preparing a ready-to-use heat transfer fluid by dilution, the optimal level of water added to the heat transfer concentrate at use conditions may be determined by the desired freeze-up, boil-over, and corrosion protection requirements.

Heat transfer fluid concentrate that has not been diluted by adding water is typically not used in an engine cooling system as a heat transfer fluid due to its relatively low heat transfer coefficient (or specific heat), high viscosity, and high freeze point. Thus, heat transfer fluid concentrates may be diluted (e.g., to 30 vol. % to 60 vol. % solutions) by adding water before being used in engine cooling systems as heat transfer fluids. Vehicle manufacturers typically use 50 vol. % heat transfer concentrate diluted by water as factory fill fluid in vehicle cooling systems. Heat transfer fluid products that are pre-diluted by water to contain about 30 vol. % to about 60 vol. % heat transfer fluid concentrate are ready-to-use coolants because no additional water is needed when they are added into a vehicle cooling system.

In a ready-to-use heat transfer fluid, the freezing point depressant may be present in an amount of about 1 wt. % to less than about 90 wt. %, based on the total weight of the ready-to-use heat transfer fluid. Within this range, the amount of the freezing point depressant may be greater than or equal to about 25 wt. %, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 75 wt. %, greater than or equal to about 80 wt. %, greater than or equal to about 85 wt. %, greater than or equal to about 86 wt. %, greater than or equal to about 87 wt. %, greater than or equal to about 88 wt. %, or greater than or equal to about 89 wt. %, but less than about 90 wt. % based on the total weight of the ready-to-use heat transfer fluid. Also, within this range, the amount of the freezing point depressant may be less than or equal to about 30 wt. %, less than or equal to about 40 wt. %, less than or equal to about 50 wt. %, less than or equal to about 55 wt. %, less than or equal to about 60 wt. %, less than or equal to about 70 wt. %, less than or equal to about 75 wt. %, less than or equal to about 80 wt. %, less than or equal to about 85 wt. %, less than or equal to about 86 wt. %, less than or equal to about 87 wt. %, less than or equal to about 88 wt. %, or less than or equal to about 89 wt. %, but more than about 1 wt. % based on the total weight of the ready-to-use heat transfer fluid.

In the ready-to-use heat transfer fluid, the organophosphate may be present in an amount of about 0.001 wt. % to about 5 wt. %, based on the total weight of the ready-to-use heat transfer fluid. Within this range, the amount may be greater than or equal to about 0.005 wt. %, or, in some embodiments, greater than or equal to about 0.01 wt. %. Also within this range, the amount may be less than or equal to about 3 wt. %, or, in some embodiments, less than or equal to about 1 wt. %.

In the ready-to-use heat transfer fluid, the carboxylate may be present in an amount of about 0.5 wt. % to about 8 wt. %, based on the total weight of the ready-to-use heat transfer fluid. Within this range, the amount may be greater than or equal to about 0.6 wt. %, or, in some embodiments, greater than or equal to about 0.7 wt. %. Also within this range, the amount may be less than or equal to about 7 wt. %, or, in some embodiments, less than or equal to about 6 wt. %.

For embodiments in which the ready-to-use heat transfer fluid includes one or more alkaline earth metal ions, the total amount of alkaline earth metal ion may range from about 0.0001 wt. % to about 0.02 wt. % based on the total weight of the ready-to-use heat transfer fluid. Within this range, the amount may be greater than or equal to about 0.001 wt. %, or, in some embodiments, greater than or equal to about 0.002 wt. %. Also within this range, the amount may be less than or equal to about 0.01 wt. %, or, in some embodiments, less than or equal to about 0.006 wt. %.

For embodiments in which the ready-to-use heat transfer fluid includes calcium ion, the total amount of calcium ion may be greater than about 0.5 ppm based on the total weight of the ready-to-use heat transfer fluid. Within this range, the amount of calcium ion may be less than about 50 ppm. Also within this range, the amount of calcium ion may be less than or equal to about 20 ppm.

For embodiments in which the ready-to-use heat transfer fluid includes magnesium ion, the total amount of magnesium ion may be greater than about 0.5 ppm based on the total weight of the ready-to-use heat transfer fluid. Within this range, the amount of magnesium ion may be less than about 60 ppm. Also within this range, the amount of magnesium ion may be less than or equal to about 25 ppm.

For embodiments in which the ready-to-use heat transfer fluid includes strontium ion, the total amount of strontium ion may be greater than about 0.1 ppm based on the total weight of the ready-to-use heat transfer fluid. Within this range, the amount of strontium ion may be less than about 40 ppm. Also within this range, the amount of strontium ion may be less than or equal to about 20 ppm.

For embodiments in which the ready-to-use heat transfer fluid includes water-soluble inorganic phosphate, the total amount of water-soluble inorganic phosphate may be greater than about 0.5 ppm as P based on the total weight of the ready-to-use heat transfer fluid. Within this range, the amount of water-soluble inorganic phosphate may be less than about 2000 ppm as P. Also within this range, the amount of water-soluble inorganic phosphate may be less than or equal to about 500 ppm as P.

For embodiments in which the ready-to-use heat transfer fluid includes lithium ion, the total amount of lithium ion may be greater than about 0.0001 ppm based on the total weight of the ready-to-use heat transfer fluid. Within this range, the amount of lithium ion may be less than about 6000 ppm. Also within this range, the amount of lithium ion may be less than or equal to about 2500 ppm.

For embodiments in which the ready-to-use heat transfer fluid includes zinc ion, the total amount of zinc ion may be greater than about 0.0001 ppm based on the total weight of the ready-to-use heat transfer fluid. Within this range, the amount of zinc ion may be less than about 30 ppm. Also within this range, the amount of zinc ion may be less than or equal to about 15 ppm.

For embodiments in which the ready-to-use heat transfer fluid includes nitrate, the total amount of nitrate may be greater than about 0.0001 ppm based on the total weight of the ready-to-use heat transfer fluid. Within this range, the amount of nitrate may be less than about 20,000 ppm. Also within this range, the amount of nitrate may be less than or equal to about 5000 ppm.

For embodiments in which the ready-to-use heat transfer fluid includes nitrite, the total amount of nitrite may be greater than about 0.0001 ppm based on the total weight of the ready-to-use heat transfer fluid. Within this range, the amount of nitrite may be less than about 20,000 ppm. Also within this range, the amount of nitrite may be less than or equal to about 5000 ppm.

For embodiments in which the ready-to-use heat transfer fluid includes molybdate, the total amount of molybdate may be greater than about 0.0001 ppm based on the total weight of the ready-to-use heat transfer fluid. Within this range, the amount of molybdate may be less than about 20,000 ppm. Also within this range, the amount of molybdate may be less than or equal to about 2000 ppm.

For embodiments in which the ready-to-use heat transfer fluid includes azole compound, the total amount of azole compound may range from about 0.005 wt. % to about 2 wt. % based on the total weight of the ready-to-use heat transfer fluid. Within this range, the azole compound may be present in an amount greater than or equal to about 0.007 wt. %, or, in some embodiments, greater than or equal to about 0.01 wt. %. Also within this range, the azole compound may be present in an amount less than or equal to about 1.5 wt. %, or, in some embodiments, less than or equal to about 1 wt. %.

For embodiments in which the ready-to-use heat transfer fluid includes copper and copper alloy corrosion inhibitor, the total amount of copper and copper alloy corrosion inhibitor may be greater than about 0.0001 ppm based on the total weight of the ready-to-use heat transfer fluid. Within this range, the amount of copper and copper alloy corrosion inhibitor may be less than about 10,000 ppm. Also within this range, the amount of copper and copper alloy corrosion inhibitor may be less than or equal to about 2500 ppm.

For embodiments in which the ready-to-use heat transfer fluid includes silicate, the total amount of silicate may be greater than about 0.0001 ppm based on the total weight of the ready-to-use heat transfer fluid. Within this range, the amount of silicate may be less than about 1000 ppm as Si. Also within this range, the amount of silicate may be less than or equal to about 600 ppm as Si.

For embodiments in which the ready-to-use heat transfer fluid includes silicate stabilizer, the silicate stabilizer may be present in an amount greater than about 0.0001 ppm based on the total weight of the ready-to-use heat transfer fluid. Within this range, the amount of silicate stabilizer may be less than about 3000 ppm. Also within this range, the amount of silicate stabilizer may be less than or equal to about 800 ppm.

For embodiments in which the ready-to-use heat transfer fluid includes acrylate-based polymer, the total amount of acrylate-based polymer may be greater than about 0.0001 ppm based on the total weight of the ready-to-use heat transfer fluid. Within this range, the amount of acrylate-based polymer may be less than about 5000 ppm. Also within this range, the amount of acrylate-based polymer may be less than or equal to about 1500 ppm.

The pH of the ready-to-use heat transfer fluid may be between about 6.8 and about 10.0 at room temperature. Within this range, the pH may be greater than or equal to about 7.5 or, in some embodiments, greater than or equal to about 7.8. Also within this range, the pH may be less than or equal to about 9.0 or, in some embodiments, less than or equal to about 8.8.

A method of preventing corrosion in accordance with the present teachings includes contacting a ready-to-use heat transfer fluid of a type described herein with a heat transfer system. The heat transfer system may include one or a plurality of components manufactured by controlled atmosphere brazing (i.e., CAB). In some embodiments, the heat transfer system may include aluminum.

It is also contemplated that in some applications, such as heavy duty engines, it may be desirable to incorporate one or more additional corrosion inhibitors (e.g., including but not limited to nitrites, molybdates, and/or the like, salts thereof, and combinations thereof).

Ready-to-use heat transfer fluids in accordance with the present teachings are further demonstrated by the following non-limiting examples. The following examples illustrate features in accordance with the present teachings, and are provided solely by way of illustration. They are not intended to limit the scope of the appended claims or their equivalents.

EXAMPLES

Three different tests were used to demonstrate the improved corrosion protection performance of heat transfer fluids in accordance with the present teachings as compared to other heat transfer fluids. The test heat transfer fluid (or coolant) solutions were prepared by diluting a heat transfer fluid concentrate with deionized water to the desired concentrations of either 25 vol. % or 50 vol. % solutions. The additives (e.g., organophosphates, HEDP, phenyl phosphonic acid, calcium acetate monohydrate, magnesium acetate tetrahydrate, polyacrylates, etc.) were either added in the coolant concentrates or added during the preparation of the coolant concentrate formulations P, Q, and R shown in Table 6.

The radiator cube leaching test was used to compare and differentiate the performance of the tested heat transfer fluids with respect to fast passivation and reduced nitrite consumption when the tested fluids are in contact with aluminum heat exchanger part surfaces manufactured by the CAB technique. Two different types of radiators from two different models of recently introduced North American light duty vehicles were selected for testing. The radiators have folded tubes (B-type tubes). The aluminum parts of the radiators were cut into cubes with approximate dimensions of 25 mm×25 mm×25 mm. The desired numbers (12 to 22) of the radiator cubes were put into either a new polypropylene bottle (500-mL or 1000-mL) or glass bottle (16-oz.). 50 vol. % of the pre-diluted heat transfer fluid test solution was added into the bottles with radiator cubes to fully immerse the cubes. The bottles were then sealed tightly with a cap and put in an oven at a temperature for 100° C. for 14 days. At the end of the leaching test, the radiator cubes were removed and the top portion of the test solution was sampled for analysis. The amount of heat transfer fluid solution and the numbers of radiator cubes used in the tests were selected so that the test solution volume per gram of the radiator cubes would have values of between about 9.5 mL/g and about 15 mL/g. A test condition with a lower test solution volume per gram of the radiator cube value corresponds to a more demanding test condition.

ASTM D4340 tests and anodic polarization curve measurements under modified GM9066P test conditions were used to measure and compare the performance of the heat transfer fluids with respect to the protection of cast aluminum from high temperature corrosion under heat rejecting heat transfer conditions, typically encountered in engine blocks and cylinder heads. The test set-up used in the anodic polarization measurements was the same as the one specified in GM9066P. The test solutions contained 25 vol. % coolant (diluted by deionized water) plus 100 ppm chloride from NaCl. A sand cast AA319 cut from an engine block was used as the working electrode. The AA319 electrode surface temperature was controlled at 130±2° C. during the test. The anodic polarization curve was obtained after the solution temperature had reached steady state values (i.e., 102±2° C.) for 5 to 6 hours using a scan rate of 2 mV/sec. The ASTM D4340 tests were conducted according to the latest ASTM D4340 specification.

Experimental data showing the benefits of using heat transfer fluids in accordance with the present teachings are summarized in Tables 4 through 19 below. Table 4 shows the compositions of base heat transfer fluid concentrates A to H (or coolant concentrates) used to prepare the heat transfer fluid solutions used in the tests. Table 5 shows the compositions of base heat transfer fluid concentrates I to N (or coolant concentrates) used to prepare the heat transfer fluid solutions used in the tests. Table 6 shows the compositions of base heat transfer fluid concentrates P to R (or coolant concentrates) used to prepare the heat transfer fluid solutions used in the tests. Tables 7 to 10 show the results obtained in radiator cube leaching tests for Comparative Examples 1 to 12 using comparative heat transfer fluids as test solutions. Tables 11 to 18 show the results obtained in radiator cube leaching tests for Examples 1 to 30 using heat transfer fluids in accordance with the present teachings. Table 19 shows ASTM D4340 test results for comparative heat transfer fluid solutions (Comparative Examples 13 to 22) and heat transfer fluid solutions in accordance with the present teachings (Examples 31 to 51).

The results clearly show that the coolants (or heat transfer fluids) that contain organophosphates or phosphate esters (e.g., Triton H-66, Triton H-55, Cedephos FA-600, Chemfac NF-100, Chemfac NA-350, Chemfac PF-636, butyl acid phosphate, ethyl hexyl acid phosphate, isooctyl acid phosphate) in accordance with the present teachings yield substantially better corrosion protection performance than the corresponding fluids of the comparative examples which do not contain organophosphate.

Comparative Examples 2, 3, and 4 in Table 7 and Comparative Examples 11 and 12 in Table 10 show a nearly 100% reduction in nitrite in the absence of organophosphate for four different test coolants after 2 weeks of radiator cube leaching test at 100° C. By contrast, in the presence of 0.025 wt. % to 0.2 wt. % of organophosphates in the test coolants shown in the examples in Tables 11 through 18, the reduction in nitrite concentration in the test coolants after 2 weeks of radiator cube leaching test at 100° C. was drastically reduced. In some cases, as shown in Example 11 (Table 13) and Examples 21 through 24 (Table 16), in the presence of Triton H-55 or Triton H-66 at a concentration between 0.05 wt. % and 0.1 wt. %, the reduction in nitrite concentrations in the test coolants after 2 weeks of radiator cube leaching test at 100° C. was reduced to a level that was even better than that achieved in the test coolant containing inorganic phosphate, calcium ions, magnesium ions, and polyacrylate described in U.S. Pat. No. 8,617,416 B1 (see Comparative Example 1 in Table 7).

United States Patent Application Publication No. 2014/0061529 A1 describes a method to passivate the chemical reactivity of metal surfaces of heat exchangers with coolants in the presence of nitrites by adding 1-hydroxyethylidene-1,1-diphosphonic acid (HEDP), phenylphosphonic acid, or phenylphosphinic acid. The addition of HEDP, phenylphosphonic acid, or phenylphosphinic acid to an engine coolant containing 2-ethylhexanoic acid, sebacic acid and tolytriazole led to a reduction in the consumption of nitrite when the coolant was in contact with aluminum automotive heat exchangers. Notwithstanding, the improvement in the passivation of potassium fluoroaluminate flux residue covered brazed aluminum surface in the presence of organophosphates in test coolants in accordance with the present teachings was substantially better than what was achieved using phenylphosphonate as described in U.S. Patent Application Publication No. 2014/0061529 A1 (cf. Comparative Examples 5 through 7 in Table 8; Comparative Examples 9 and 10 in Table 9; and the Examples in Tables 11 through 18). The results in Table 19 show that the presence of the most effective coolant additive HEDP in the 9 different test coolant formulations according to the description in U.S. Patent Application Publication No. 2014/0061529 A1 (see also U.S. Patent Application Publication No. 2015/0267101 A1) led to very high cast aluminum AA329 corrosion rates under ASTM D4340 test conditions. These rates substantially exceed the corrosion rate requirement of no more than 1.0 mg/cm$^2$/week in ASTM D4340 test by ASTM D3306, D6210, as well as the engineering standards of many automotive OEMs on glycol base engine coolants for light duty and heavy duty services.

By contrast, as shown in Table 19, test coolants in accordance with the present teachings containing organophosphates such as Triton H-66, Chemfac NF100, and isooctyl acid phosphate all yield much lower corrosion rates in the ASTM D4340 tests than the test coolant solution containing HEDP and, moreover, satisfy the corrosion rate requirements of ASTM D3306 and D6210 on glycol base engine coolants for light duty and heavy duty services. As shown in Table 19, some of the test coolants containing Chemfac NF-100, Triton H-66, isooctyl acid phosphate, Chemfac NF-100, or Triton H-66 in concentration ranges in accordance with the present teachings yielded ASTM D4340 corrosion rates less than 0.1 mg/cm$^2$/week (e.g., see Examples 39 through 47, and Example 51 in Table 19).

The results shown in Tables 11 through 19 further indicate that coolants containing organophosphate in accordance with the present teachings may not only provide superior corrosion protection and substantially reduced nitrite consumption when in contact with CAB aluminum heat exchanger surfaces, but may also provide superior corrosion protection under the heat-rejecting high temperature conditions typically encountered in engine blocks and cylinder heads in engine cooling systems. For example, the superior corrosion protection under heat-rejecting high temperature conditions may be observed in the presence of calcium ions and magnesium ions, or strontium ions and magnesium ions—with or without the further presence of polyacrylate in a concentration range in accordance with the present teachings. Visual observation of the post D4340 test samples for Examples 40 through 48 in Table 19 shows that the metal surface had no sign of corrosion and remained shiny in appearance and in as-new condition—thus, in agreement with the corrosion rate results obtained from weight loss measurement on the test samples.

TABLE 4

Test Coolant Formulations A-H.

| Ingredient | A wt. % | B wt. % | C wt. % | D wt. % | E wt. % | F wt. % | G wt. % | H wt. % |
|---|---|---|---|---|---|---|---|---|
| EG | 91.1757 | 93.6845 | 91.2287 | >90 | >90 | >90 | >90 | >90 |
| Sodium Tolytriazole, 50% | | 0.2500 | 0.4190 | ~0.5 | ~0.5 | ~0.5 | ~0.5 | ~0.5 |
| NaOH, 50% | 1.8600 | 2.0169 | 2.0419 | | | | | |
| Neo Decanoic Acid, wt. % | 0.8350 | 0.9619 | 0.9168 | | | | | |
| 2-Ethyl Hexanoic Acid, wt. % | 2.5000 | 2.8857 | 2.9589 | 3.1 to 3.4 | 3.1 to 3.4 | 3.1 to 3.4 | 3.18 | 3.8~4 |
| Sebacic acid, wt. % | | | | 0.2 to 0.3 | 0.2 to 0.3 | 0.2 to 0.3 | 0.23 | ~0.3 |
| Benzoic acid, wt. % | | | | | | | | |
| Tert-butyl benzoic acid, wt. % | | | | | | | | |
| p-toluic acid, wt. % | | | | | | | | |
| PM 5150, antifoam | 0.2000 | 0.2000 | 0.1996 | | | | | |
| Benzotriazole, 20% EG slurry | | | | | | | | |
| Ethylene Glycol | 0.8000 | | | | | | | |
| Benzotriazole | 0.2000 | | | | | | | |
| Sodium Molybdate, 41.1% | 0.5000 | | 0.4391 | | | 0.7297 | | |
| Sodium Nitrite, 10% in EG | 1.8000 | | 1.7962 | | 1.1454 | 1.7062 | | |
| Ethylene Glycol | | | | | | | | |
| Treated Water | | | | | | | | |
| Sodium Nitrite | | | | | | | | |
| Potassium Nitrite | | | | | | | 1261 mg/L as Nitrite | 1100~1200 mg/L as Nitrite |
| Potassium Molybdate | | | | | | | 1270 mg/L as Mo | 1750 to 1910 mg/L as Mo |
| Aquatreat AR-900, Polyacrylate | 0.0893 | | | | | | | |
| Aquatreat AR-940, Polyacrylate | | | | | | 0.0585 | | |
| Polyvinylpyrrolidone, 20% aq. solution of PVP K-90 | | | | | | | 0.24 | |
| Chromatint Uranine Dye | | 0.0010 | | | | | | |
| Chromatint Yellow 0963 | | | | | | | | |
| Chromatint Red 3382 Liquid dye | | | | | | | | |
| Chromatint Red 1690 Liquid Dye | | | | | | | | |
| Chromatint Orange 1835 Liquid Dye | 0.0400 | | | | | | | |

TABLE 4-continued

Test Coolant Formulations A-H.

| Ingredient | A wt. % | B wt. % | C wt. % | D wt. % | E wt. % | F wt. % | G wt. % | H wt. % |
|---|---|---|---|---|---|---|---|---|
| Other Coolant Additives Denatonium Benzoate | | | | Present | Present | Present | Present | Present |
| Antifoam | | | | Present | Present | Present | Present | Present |
| KOH | | | | Present | Present | Present | Present | Present |
| Sum | 100.0000 | 100.0000 | 100.0000 | 100 | 100 | 100 | 100 | 100 |
| pH @ 50 vol. % | 8.6 | 8.6 | 8.85 | 8.5 | 8.5 | 8.5 | 8.6 | 8.9 |

TABLE 5

Test Coolant Formulations I-N.

| Ingredient | I wt. % | J wt. % | K wt. % | L wt. % | M wt. % | N wt. % |
|---|---|---|---|---|---|---|
| EG | >90 | >90 | >95 | 93.3334 | 91.4701 | 93.4230 |
| Sodium Tolytriazole, 50% | | | | 0.4200 | 0.4200 | 0.4200 |
| NaOH, 50% | ~0.7 | ~0.65 | Present | 1.8876 | 1.8961 | 1.8875 |
| Neo Decanoic Acid, wt. % | | | | 0.9138 | 0.9185 | 0.9138 |
| 2-Ethyl Hexanoic Acid, wt. % | | | | 2.7414 | 2.7500 | 2.7413 |
| Sebacic acid, wt. % | ~2 | | ~0.8 | | | |
| Benzoic acid, wt. % | | 3.1 to 3.4 | ~0.7 | | | |
| Tert-butyl benzoic acid, wt. % | | ~2 | | | | |
| p-toluic acid, wt. % | 0.7 to 0.8 | ~1.1 | | | | |
| PM 5150, antifoam | | | | 0.2000 | 0.2000 | 0.2000 |
| Benzotriazole, 20% EG slurry | | | 2800 ppm as BZT | | | |
| Ethylene Glycol Benzotriazole | | | | | | |
| Sodium Molybdate, 41.1% | | ~0.25 | | 0.4000 | 0.4400 | 0.4000 |
| Sodium Nitrite, 10% in EG Ethylene Glycol | | | | | 1.4940 | |
| Treated Water | | | | | 0.1260 | |
| Sodium Nitrite | | | | | 0.1800 | |
| Potassium Nitrite | | | | | | |
| Potassium Molybdate | | | | | | |
| Aquatreat AR-900, Polyacrylate | | | | 0.0893 | 0.0893 | |
| Aquatreat AR-940, Polyacrylate | | | | | | |
| Polyvinylpyrrolidone, 20% aq. solution of PVP K-90 | | | | | | |
| Chromatint Uranine Dye | | | | | | |
| Chromatint Yellow 0963 | | | | 0.0145 | | 0.0145 |
| Chromatint Red 3382 Liquid dye | | | | | 0.0115 | |
| Chromatint Red 1690 Liquid Dye | | | | | 0.0045 | |
| Chromatint Orange 1835 Liquid Dye | | | | | | |
| Other Coolant Additives Denatonium Benzoate | Present | Present | Present | | | |
| Antifoam | Present | Present | Present | | | |
| KOH | Present | Present | | | | |
| Sum | 100 | 100 | 100 | 100.0000 | 100.0000 | 100.0000 |
| pH @ 50 vol. % | 8.2 | 8.4 | 8 | 8.6 | 8.6 | 8.7 |

TABLE 6

Test Coolant Formulations P-R

| Coolant IB Ingredients | P wt. % | Q wt. % | R wt. % |
|---|---|---|---|
| Ethylene Glycol | 93.6299 | 93.4620 | 93.4390 |
| Sodium Tolytriazole, 50% | 0.2002 | 0.2002 | 0.2002 |
| Sodium Hydroxide, 50% | 0.1001 | 0.1002 | 0.1001 |
| AR-940, Sodium polyacrylate (MW = 2600) aqueous solution, 40% solid, pH = 8.3; ~37% active | 0.0701 | 0.0701 | 0.0701 |
| DI H$_2$O | 0.0877 | 0.0877 | 0.0877 |
| Ethylene Glycol | 0.0627 | 0.0626 | 0.0627 |
| Ca(Ac)$_2$*H$_2$O, MW = 176.18 | 0.0050 | 0.0050 | 0.0050 |
| Magnesium acetate tetrahydrate, | 0.0220 | 0.0220 | 0.0220 |

TABLE 6-continued

Test Coolant Formulations P-R

| Coolant IB Ingredients | P wt. % | Q wt. % | R wt. % |
|---|---|---|---|
| MW = 214.45 | | | |
| Sodium Hydroxide, 50% | 1.8770 | 1.9501 | 1.9959 |
| Neo Decanoic Acid, Prime | 0.8610 | 0.8609 | 0.8610 |
| 2-Ethyl Hexanoic acid | 2.5830 | 2.5828 | 2.5830 |
| Chemfac NF-100 | 0.2552 | 0.3503 | 0.2002 |
| $H_3PO_4$, 75% | | | 0.1271 |
| DI $H_2O$ | 0.0450 | 0.0450 | 0.0450 |
| PM-5150 antifoam | 0.2002 | 0.2002 | 0.2002 |
| Chromatint Uranine Dye | 0.0010 | 0.0010 | 0.0010 |
| Total % | 100.0000 | 100.0000 | 100.0000 |
| pH @ 50 vol. % | 8.13 | 8.34 | 8.31 |

FIG. 1 shows the anodic polarization measurements obtained on an AA319 cast aluminum alloy electrode immersed in 25 vol. % coolant concentrate+100 ppm chloride ions for 6 hours under the heat rejection heat transfer conditions. The AA319 electrode surface temperature is 130° C. One may see that the coolants P and R (Table 6) containing an organophosphate (Chemfac NF-100) provided substantially better corrosion protection for the AA319 cast aluminum cut from 3.0-L vehicle engine block than other coolants (i.e., Coolant E, Coolant E+0.05 wt. % HEDP sodium salt, Coolant D and Coolant J) under the test conditions. As shown in FIG. 1, the presence of HEDP in Coolant E resulted in a significant increase in corrosion of AA319 under heat rejecting high temperature corrosion conditions, in agreement with ASTM D4340 results shown in Table 19. In fact, the results in FIG. 1 show that Coolant E+0.05 wt. % HEDP sodium salt had the highest AA319 corrosion attack under the test conditions.

TABLE 7

Radiator Cube leaching Test Results for Comparative Examples 1-4.

| | Comparative Example | | | |
|---|---|---|---|---|
| | Comp. Ex. 1 | | Comp. Ex. 2 | |
| Solution Volume per gram of radiator cube, mL/g | 14.68 | | 14.26 | |
| Test Coolant Solution | 50 vol. % [Coolant A + Ca/Mg/PAA/$H_3PO_4$] | | 50 vol. % Coolant A | |
| Test Conditions | 555.2 g Coolant A concentrate + 5.55 g Super concentrate coolant additive (containing 0.5 wt. % calcium acetate monohydrate + 2.6 wt. % magnesium acetate tetrahydrate + 25.5 wt. % phosphoric acid, 75% + 7 wt. % Aquatreat AR-940 polyacrylate + 64.4 wt. % DI $H_2O$) + 1.5586 g 50% NaOH => Comp. Ex. 1 Test Coolant | 22 cubes (64.7 g) cut from new radiator A, 2 wks @ 100° C.; 950 mL coolant solution used in the test | 500 mL Coolant A concentrate + 500 mL DI $H_2O$ => Comp. Ex. 2 Test Coolant | 12 cubes (66.6 g) cut from a New radiator B, B-type, 2 wks @ 90 C.; 950 mL coolant solution used in the test |
| pH, As Is | 8.3 | 7.8 | 8.5 | 10.7 |
| EG, vol. % | 51.9 | 52.5 | 51.7 | 52.4 |
| Nitrate, mg/L | <10 | 105 | ND | 22 |
| Nitrite, mg/L | 675 | 572 | 654 | <10 |
| % $NO_2$ reduction - included the effect of coolant concentration change | | 16.23% | | ~100% |
| % $NO_2$ Reduction - No coolant concentration change correction | | 15.26% | | 99.24% |

TABLE 7-continued

Radiator Cube leaching Test Results for Comparative Examples 1-4.

| | Comparative Example | | | |
|---|---|---|---|---|
| | Comp. Ex. 3 | | Comp. Ex. 4 | |
| Solution Volume per gram of radiator cube, mL/g | 9.98 | | 10.04 | |
| Test Coolant Solution | 50 vol. % Coolant A | | 50 vol. % Coolant C | |
| Test Conditions | 333.0 g (or 300 mL) Coolant A concentrate + 300 mL DI H$_2$O => Comp. Ex. 3 test coolant | 16 cubes (47.6 g) cut from a new radiator A, 2 wks @ 100° C.; 475 mL coolant solution used in the test | 333.0 g Coolant C concentrate + 300 mL DI H$_2$O => Comp. Ex. 4 test solution | 16 cubes (47.3 g) cut from a new radiator A, B-type, 2 wks @ 100° C.; 475 mL coolant solution used in the test |
| pH, As Is | 8.7 | 10 | 8.9 | 9.1 |
| EG, vol. % | 51.7 | 52.9 | 51 | 51.9 |
| Nitrate, mg/L | ND | 53 | ND | 55 |
| Nitrite, mg/L | 666 | <5 | 636 | <10 |
| % NO$_2$ reduction - included the effect of coolant concentration change | | ~100% | | ~100% |
| % NO$_2$ Reduction - No coolant concentration change correction | | 99.62% | | 99.21% |

TABLE 8

Radiator Cube Leaching Test Results for Comparative Examples 5-7.

| | Comparative Example | | | | | |
|---|---|---|---|---|---|---|
| | Comp. Ex. 5 | | Com. Ex. 6 | | Comp. Ex. 7 | |
| Solution Volume per gram of radiator cube, mL/g | 9.85 | | 9.42 | | 9.77 | |
| Test Coolant Solution | 50 vol. % [Coolant F + 0.0224 wt. % phenyl phosphonic acid] | | 50 vol. % [Coolant A + 0.0226 wt. % phenyl phosphonic acid] | | 50 vol. % [Coolant A + 0.0441 wt. % phenyl phosphonic acid] | |
| Test Conditions | 333.0 g Coolant F concentrate + 0.0746 g phenyl phosphonic acid, or 0.0224 wt. % + 300 mL DI H$_2$O => Comp. Ex. 5 test solution | 16 cubes (48.2 g) cut from a new radiator A, B-type, 2 wks @ 100° C.; 475 mL coolant solution used in the test | 333.0 g Coolant A concentrate + 0.0752 g phenyl phosphonic acid, 0.0226 wt. % in the coolant + 300 mL DI H$_2$O => Comp. Ex. 6 test solution | 16 cubes (50.4 g) cut from a New radiator A, B-type, 2 wks @ 100° C.; 475 mL coolant solution used in the test | 333.0 g Coolant A concentrate + 0.1470 g phenyl phosphonic acid, or 0.0441 wt. % in the coolant concentrate + 300 mL DI H$_2$O => Comp. Ex. 7 test solution | 16 cubes (48.6 g) cut from a New radiator A, B-type, 2 wks @ 100° C.; 475 mL coolant solution used in the test |
| pH, As Is | 8.3 | 8.3 | 8.4 | 9.5 | 8.2 | 9.7 |
| EG, vol. % | 50.3 | 51.2 | 51.6 | 52.6 | 52 | 53 |
| Nitrate, mg/L | ND | 115 | ND | 70 | ND | 78 |
| Nitrite, mg/L | 574 | 290 | 691 | <10 | 674 | <10 |
| % NO$_2$ reduction - included the effect of concentration change | | 50.37% | | ~100% | | ~100% |
| % NO$_2$ Reduction - No concentration change correction | | 49.48% | | 99.28% | | 99.26% |

TABLE 9

Radiator Cube Leaching Test Results for Comparative Examples 8-10.

| | Comp. Ex. 8 | | Comp. Ex. 9 | | Comp. Ex. 10 | |
|---|---|---|---|---|---|---|
| Solution Volume per gram of radiator cube, mL/g | 9.39 | | 9.71 | | 9.85 | |
| Test Coolant Solution | 50 vol. % Coolant F | | 50 vol. % [Coolant A + 0.10 wt. % phenyl phosphonic acid] | | 50 vol. % [Coolant G + 0.10 wt. % phenyl phosphonic acid] | |
| Test Conditions | 275.4 g Coolant F concentrate + 250 mL DI $H_2O$ => comp. Ex. 8 Test solution | 17 cubes (50.6 g) cut from a New radiator A, B-type, 2 wks @ 100° C.; 475 mL coolant solution used in the test | 277.3 g Coolant A concentrate + 250 mL DI $H_2O$ + 0.2802 g phenylphosphonic acid => Comp. Ex. 9 test solution | 16 cubes (48.9 g) New radiator A, cut to 1" × 1" cubes, B-type, 2 wks @ 100° C.; 475 mL coolant solution used in the test. 500-mL PP bottle | 250 mL Coolant G concentrate + 250 mL DI $H_2O$ + 0.2811 g phenyl phosphonic acid or 0.1 wt. % phenyl phosphonic acid in the coolant concentrate => Comp. Ex. 11 test solution | 16 cubes (48.2 g) cut from a New radiator A, B-type, 2 wks @ 100° C.; 475 mL coolant solution used in the test |
| pH, As Is | 8.3 | 8.2 | 7.7 | 9.4 | 7.4 | 8.5 |
| EG, vol. % | 50 | 50.9 | 51.5 | 52.4 | 51.3 | 52.1 |
| Nitrate, mg/L | ND | 102 | ND | 130 | 29 | 123 |
| Nitrite, mg/L | 553 | 306 | 679 | 11 | 602 | 143 |
| % $NO_2$ reduction - included the effect of concentration change | | 45.64% | | 98.41% | | 76.61% |
| % $NO_2$ Reduction - No concentration change correction | | 44.67% | | 98.38% | | 76.25% |

TABLE 10

Radiator Cube Leaching Test Results for Comparative Examples 11-12.

| | Comp. Ex. 11 | | Comp. Ex. 12 | |
|---|---|---|---|---|
| Solution Volume per gram of radiator cube, mL/g | 10.63 | | 10.42 | |
| Test Coolant Solution | 50 vol. % [Coolant K + 1.7 wt. % 10% $NaNO_2$ in EG + 0.7 wt. % 41.1% $Na_2MoO_4$] | | 50 vol. % [Coolant C + 0.091 wt. % AR900] | |
| Test Conditions | 225 mL Coolant K concentrate + 225 mL DI $H_2O$ + 4.5 g 10% $NaNO_2$ + 1.8 g 41.1% $Na_2MoO_4$ => Comp. Ex. 11 test solution | 14 cubes (40.0 g) cut from a New radiator A, B-type, 2 wks @ 100° C.; 425 mL coolant solution used in the test; 16-oz. soda-Lime Glass bottle | 225 mL/249.6 g Coolant C concentrate + 250 mL DI H2O + 0.2267 g Aquatreat AR900, PAA => Comp. Ex. 12 test solution | 14 cubes (40.8 g) cut from a New radiator A, B-type, wks @ 100° C.; 425 mL coolant solution used in the test; 16-oz. soda-Lime Glass bottle |
| pH, As Is | 8.2 | 8.9 | 8.7 | 9.9 |
| EG, vol. % | 51.4 | 53.7 | 51.8 | 53.6 |
| Nitrate, mg/L | ND | 31 | ND | 49 |
| Nitrite, mg/L | 596 | ND | 637 | ND |
| % $NO_2$ reduction - included the effect of concentration change | | 100.00% | | 100.00% |
| % $NO_2$ Reduction - No concentration change correction | | 100.00% | | 100.00% |

TABLE 11

Radiator Cube Leaching Test Results for Examples 1-4.

| | Example | | | | | | | |
|---|---|---|---|---|---|---|---|---|
| | 1 | | 2 | | 3 | | 4 | |
| Solution Volume per gram of radiator cube, mL/g | 9.85 | | 9.46 | | 9.50 | | 9.60 | |
| Test Coolant Solution ID | 50 vol. % [Coolant A + 0.0255 wt. % Chemfac PF-636] | | 50 vol. % [Coolant A + 0.10 wt. % Chemfac NF-100] | | 50 vol. % [Coolant A + 0.20 wt. % Chemfac NF-100] | | 50 vol. % [Coolant F + 0.10 wt. % Chemfac NF-100] | |
| Test Conditions | 333.0 g Coolant A + 0.0850 g Chemfac PF-636, or 0.0255 wt. % + 300 mL DI $H_2O$ => Exp. 1 Test solution | 16 cubes (48.2 g) cut from a new radiator A, B-type, 2 wks @ 100° C.; 475 mL coolant solution used in the test | 333.0 g (or ~300 mL) Coolant A concentrate + 0.3330 g Chemfac NF-100, 0.100 wt. % + 300 mL DI $H_2O$ => Exp. 2 Test Solution | 17 cubes (50.2 g) cut from a New radiator A, B-type, 2 wks @ 100° C.; 475 mL coolant solution used in the test | 333.0 g Coolant A concentrate + 0.6659 g Chemfac NF-100, 0.200 wt. % + 300 mL DI $H_2O$ => Exp. 3 test solution | 17 cubes (50.0 g) cut from a radiator A, B-type, 2 wks @ 100° C.; 475 mL coolant solution used in the test | 2230.9 g Coolant concentrate D + 39.0382 g 10% $NaNO_2$ in EG(1.706 w %) + 16.6956 g 41% $Na_2MoO_4$ (0.730 w %) + 1.3395 g AR-940 (0.0585 wt. % AR-940) => Coolant concentrate F; 328.6 g Coolant Concentrate F + 0.3302 g Chemfac NF-100, 2376-39-31, 0.10 wt. % + 300 mL DI $H_2O$ => Exp. 4 test solution. | 17 cubes (49.5 g) cut from a New radiator A, B-type, 2 wks @ 100° C.; 475 mL coolant solution used in the test |
| pH, As Is | 8.6 | 7.4 | 7.8 | 7.4 | 7.3 | 7.1 | 7.5 | 6.9 |
| EG, vol. % | 51.8 | 52.6 | 51.2 | 52 | 51.9 | 52.6 | 50 | 50.9 |
| Nitrate, mg/L | ND | 212 | ND | 220 | ND | 244 | ND | 222 |
| Nitrite, mg/L | 688 | 486 | 622 | 420 | 673 | 418 | 565 | 345 |
| % $NO_2$ reduction - included the effect of coolant concentration change | | 30.43% | | 33.51% | | 38.72% | | 40.02% |
| % $NO_2$ Reduction - No coolant concentration change correction | | 29.36% | | 32.48% | | 37.89% | | 38.94% |

TABLE 12

Radiator Cube Leaching Test Results for Examples 5-8.

| | Example | |
|---|---|---|
| | 5 | 6 |
| Solution Volume per gram of radiator cube, mL/g | 14.91 | 14.71 |
| Test Coolant Solution ID | 50 vol. % [Coolant A + +0.005 wt. % $CaAc_2*H_2O$ + 0.022 wt. % $MgAc_2*4H_2O$ + 0.10 wt. % Chemfac NF-100] | 50 vol. % [Coolant A + +0.005 wt. % $CaAc_2*H_2O$ + 0.022 wt. % $MgAc_2*4H_2O$ + 0.20 wt. % Chemfac NF-100] |

TABLE 12-continued

Radiator Cube Leaching Test Results for Examples 5-8.

| Test Conditions | 555.0 g Coolant Concentrate A + 0.0303 g CaAcetate monohydrate, 2376-100 + 0.1248 g MgAcetate tetrahydrate + 0.5600 g Chemfac NF-100 + 500 mL DI H$_2$O => Exp. 5 test solution | 21 cubes (63.7 g) New radiator A (cut to 1" × 1" cubes), B-type, 2 wks @ 100° C.; 950 mL coolant solution used in the test. | 555.0 g Coolant Concentrate A + 0.0278 g CaAcetate, 2376-100 + 0.1261 g MgAcetate tetrahydrate + 1.1055 g Chemfac NF-100 + 500 mL DI H$_2$O => Exp. 6 test solution | 21 cubes (64.6 g) New radiator A (cut to 1" × 1" cubes), B-type, 2 wks @ 100° C.; 950 mL coolant solution used in the test. |
|---|---|---|---|---|
| pH, As Is | 7.6 | 7.4 | 7.3 | 7.2 |
| EG, vol. % | 52.1 | 52.7 | 51.8 | 52.3 |
| Nitrate, mg/L | ND | 180 | ND | 218 |
| Nitrite, mg/L | 680 | 513 | 626 | 474 |
| % NO$_2$ reduction - included the effect of coolant concentration change | | 25.42% | | 25.01% |
| % NO$_2$ Reduction - No coolant concentration change correction | | 24.56% | | 24.28% |

| | Example | |
|---|---|---|
| | 7 | 8 |
| Solution Volume per gram of radiator cube, mL/g | 10.02 | 9.96 |
| Test Coolant Solution ID | 50 vol. % [Coolant A + 0.0568 wt. % Chemfac NA-350] | 50 vol. % [Coolant A + 0.10 wt. % Chemfac NA-350] |
| Test Conditions | 278.2 g Coolant Concentrate A + 0.1589 g Chemfac NA-350, or ~0.05 wt. % + 250 mL DI H$_2$O => Exp. 7 test solution. | 16 cubes (47.4 g) cut from a New radiator A, B-type, 2 wks @ 100° C.; 475 mL coolant solution used in the test | 278.2 g Coolant concentrate A + 0.2756 g Chemfac NA-350 or ~0.1 wt. % + 250 mL DI H$_2$O Exp. 8 test solution. | 16 cubes (47.7 g) cut from a New radiator A, B-type, 2 wks @ 100° C.; 475 mL coolant solution used in the test |
| pH, As Is | 8.3 | 7.5 | 7.9 | 7.5 |
| EG, vol. % | 52.2 | 52.8 | 51.4 | 52.2 |
| Nitrate, mg/L | 32 | 216 | 32 | 220 |
| Nitrite, mg/L | 656 | 456 | 646 | 457 |
| % NO$_2$ reduction - included the effect of coolant concentration change | | 31.28% | | 30.34% |
| % NO$_2$ Reduction - No coolant concentration change correction | | 30.49% | | 29.26% |

TABLE 13

Radiator Cube Leaching Test Results for Examples 9-12.

| | Example | | | | | | | |
|---|---|---|---|---|---|---|---|---|
| | 9 | | 10 | | 11 | | 12 | |
| Solution Volume per gram of radiator cube, mL/g | 9.58 | | 9.65 | | 10.00 | | 10.26 | |
| Test Coolant Solution | 50 vol. % [Coolant F + 0.05 wt. % Triton H-55] | | 50 vol. % [Coolant F + 0.05 wt. % Triton H-66] | | 50 vol. % [Coolant A + 0.0522 wt. % Triton H-55] | | 50 vol. % [Coolant A + 0.0537 wt. % Triton H-66] | |
| Test Conditions | 333.0 g Coolant Concentrate F + 0.1677 g Triton H-55 + 300 mL DI $H_2O$ => Exp. 9 test solution | 16 cubes (49.6 g) cut from a New radiator A, B-type, 2 wks @ 100° C.; 475 mL coolant solution used in the test | 333.0 g Coolant F concentrate + 0.1674 g Dow Triton H-66 + 300 mL DI $H_2O$ => Exp. 10 test solution | 16 cubes (49.2 g) cut from a New radiator A, 2 wks @ 100° C.; 475 mL coolant solution used in the test | 277.5 g Coolant A concentrate + 0.1450 g Triton H-55 or ~0.05 wt. % + 250 mL DI $H_2O$ Exp. 11 test solution | 16 cubes (47.5 g) cut from a New radiator A, B-type, 2 wks @ 100° C.; 475 mL coolant solution used in the test | 279.2 g Coolant A concentrate + 0.1499 g Triton H-66 or ~0.05 wt. % H-66 + 250 mL DI $H_2O$ => Exp. 12 test solution | 16 cubes (46.3 g) cut from a New radiator A, B-type, 2 wks @ 100° C.; 475 mL coolant solution used in the test |
| pH, As Is | 8.3 | 7.2 | 8.5 | 7.3 | 8.8 | 7.9 | 8.8 | 7.7 |
| EG, vol. % | 50.4 | 51.2 | 50.3 | 51.1 | 51.7 | 61.1 | 51.8 | 52.6 |
| Nitrate, mg/L | ND | 185 | ND | 185 | 30 | 144 | 33 | 152 |
| Nitrite, mg/L | 536 | 416 | 544 | 415 | 608 | 637 | 636 | 535 |
| % $NO_2$ reduction - included the effect of concentration change | | 23.60% | | 24.91% | | 11.35% | | 17.16% |
| % $NO_2$ Reduction - No concentration change correction | | 22.39% | | 23.71% | | -4.77% | | 15.88% |

TABLE 14

Radiator Cube Leaching Test Results for Examples 13-16.

| | Example | | | | | | | |
|---|---|---|---|---|---|---|---|---|
| | 13 | | 14 | | 15 | | 16 | |
| Solution Volume per gram of radiator cube, mL/g | 10.06 | | 14.73 | | 9.67 | | 9.69 | |
| Test Coolant Solution ID | 50 vol. % [Coolant A + 0.0538 wt. % Stepan FA600] | | 50 vol. % [Coolant A + 0.1 wt. % Triton H-55] | | 50 vol. % [Coolant A + 0.10 wt. % Triton H-66] | | 50 vol. % [Coolant A + 0.10 wt. % CEDEPHOS FA-600] | |
| Test Conditions | 277.0 g Coolant A concentrate + 0.1490 g Stepan FA600, or ~0.05 wt. % + 250 mL DI $H_2O$ => Exp. 13 test solution | 16 cubes (47.2 g) cut from a New radiator A, B-type, 2 wks @ 100° C.; 475 mL coolant solution used in the test | 555.0 g coolant A concentrate + 500 mL DI $H_2O$ + 0.5682 g Triton H-55, ~0.1 wt. % H-55 in coolant => Exp. 14 test solution | 21 cubes (64.5 g) New radiator A (cut to 1" × 1" cubes), B-type, 2 wks @ 100° C.; 950 mL coolant solution used in the test. | 250 mL (277.5 g) Coolant A concentrate + 250 mL DI $H_2O$ + 0.2890 g Triton H-66, ~0.1 wt. % in coolant A concentrate => Exp. 15 test solution | 16 cubes (49.1 g) New radiator A (cut to 1" × 1" cubes), B-type, 2 wks @ 100° C.; 475 mL coolant solution used in the test. 500 mL PP bottle | 277.3 g Coolant A concentrate + 250 mL DI $H_2O$ + 0.2810 g Stepan FA-600 => Exp. 16 test solution | 16 cubes (49.0 g) New radiator A (cut to 1" × 1" cubes), B-type, 2 wks @ 100° C.; 475 mL coolant solution used in the test. 500 mL PP bottle |

TABLE 14-continued

Radiator Cube Leaching Test Results for Examples 13-16.

| | Example | | | | | | | |
|---|---|---|---|---|---|---|---|---|
| | 13 | | 14 | | 15 | | 16 | |
| pH, As Is | 8.6 | 8 | 8.7 | 7.9 | 8.7 | 7.7 | 8.4 | 7.5 |
| EG, vol. % | 50.9 | 53.6 | 51.8 | 52.3 | 51.6 | 52.3 | 52.8 | 52.1 |
| Nitrate, mg/L | 29 | 141 | ND | 152 | ND | 143 | nd | 164 |
| Nitrite, mg/L | 638 | 550 | 671 | 559 | 671 | 539 | 642 | 549 |
| % NO$_2$ reduction - included the effect of coolant concentration change | | 18.14% | | 17.49% | | 20.75% | | 13.34% |
| % NO$_2$ Reduction - No coolant concentration change correction | | 13.79% | | 16.69% | | 19.67% | | 14.49% |

TABLE 15

Radiator Cube Leaching Test Results for Examples 17-20.

| | Example | | | | | | | |
|---|---|---|---|---|---|---|---|---|
| | 17 | | 18 | | 19 | | 20 | |
| Solution Volume per gram of radiator cube, mL/g | 14.29 | | 10.06 | | 10.00 | | 9.90 | |
| Test Coolant Solution ID | 50 vol. % [Coolant A + 0.20 wt. % Triton H-66] | | 50 vol. % [Coolant A + 0.201 wt. % Triton H-55] | | 50 vol. % [Coolant A + 0.204 wt. % Triton H-66] | | 50 vol. % [Coolant A + 0.205 wt. % Stepan FA600] | |
| Test Conditions | 555.0 g Coolant A + 1.11 g Triton H-66 + 500 mL DI H$_2$O => Exp. 17 test solution | 12 cubes (66.5 g) cut from a New radiator B, B-type, 2 wks @ 100° C.; 950 mL coolant solution used in the test | 276.1 g Coolant A concentrate + 0.5562 g Triton H-55 or ~0.20 wt. % in coolant + ~280 mL DI H$_2$O => Exp. 18 test solution | 16 cubes (47.2 g) cut from a New radiator A, B-type, 2 wks @ 100° C.; 475 mL coolant solution used in the test | 277.4 g Coolant A concentrate + 0.5665 g Triton H-66, or ~0.204 wt. % in coolant concentrate + 250 mL DI H$_2$O => Exp. 19 test solution | 16 cubes (47.5 g) cut from a New radiator A, B-type, 2 wks @ 100° C.; 475 mL coolant solution used in the test | 276.5 g Coolant A Concentrate + 0.5680 g Stepan FA-600 or ~0.205 wt. % in the coolant concentrate + 250 mL DI H$_2$O => Exp. 20 test solution | 16 cubes (48.0 g) cut from a New radiator A, B-type, 2 wks @ 100° C.; 475 mL coolant solution used in the test |
| pH, As Is | 8.9 | 8 | 8.9 | 7.8 | 8.8 | 7.8 | 7.9 | 7.8 |
| EG, vol. % | 52 | 52.7 | 49 | 49.6 | 51.8 | 52.5 | 51.3 | 52.1 |
| Nitrate, mg/L | ND | 159 | 33 | 133 | 31 | 146 | 33 | 161 |
| Nitrite, mg/L | 637 | 536 | 597 | 491 | 638 | 535 | 611 | 497 |
| % NO$_2$ reduction - included the effect of coolant concentration change | | 16.97% | | 18.75% | | 17.26% | | 19.91% |
| % NO$_2$ Reduction - No coolant concentration change correction | | 15.86% | | 17.76% | | 16.14% | | 18.66% |

TABLE 16

Radiator Cube Leaching Test Results for Examples 21-24.

| | Example | | | | | | | |
|---|---|---|---|---|---|---|---|---|
| | 21 | | 22 | | 23 | | 24 | |
| Solution Volume per gram of radiator cube, mL/g | 10.00 | | 14.37 | | 14.89 | | 10.79 | |
| Test Coolant Solution | 50 vol. % [Coolant G + 0.10 wt. % Triton H-66] | | 50 vol. % [Coolant C + 0.01 wt. % CaAc$_2$*H$_2$O + 0.022 wt. % MgAc$_2$*4H$_2$O + 0.1 wt. % Triton H-66] | | 50 vol. % [Coolant I + 0.59 wt. % NaNO$_2$, 10% in EG + 0.73 wt. % 41.1% Na$_2$MoO$_4$ + 0.089 wt. % Triton H-66] | | 50 vol. % [Coolant J + 0.05 wt. % Triton H-66] | |
| Test Conditions | 250 mL Coolant G concentrate + 250 mL DI H$_2$O + 0.2749 g Triton H-66, or 0.1 wt. % H-66 in coolant concentrate => Exp. 21 test solution | 16 cubes (47.5 g) cut from a New radiator A, B-type, 2 wks @ 100° C.; 475 mL coolant solution used in the test | 500 mL Coolant C concentrate + 0.0556 g or 0.01 wt. % CaAc$_2$*H$_2$O + 0.1224 g or 0.022 wt. % MgAc*6H$_2$O + 0.5563 g or 0.1 wt. % Triton H-66 + 500 mL DI H$_2$O => Exp. 22 test solution | 23 cubes (66.1 g) cut from a New radiator A, B-type, 2 wks @ 90 C.; 950 mL coolant solution used in the test | 555.0 g Coolant I concentrate + 500 mL DI H$_2$O + 3.3 g 10% NaNO$_2$ + 4.1 g 41.1% Na$_2$MoO$_4$ + 0.5 g Triton H-66 => Exp. 23 test solution | 24 cubes (63.8 g) cut from a New radiator A, B-type, 2 wks @ 100° C.; 950 mL coolant solution used in the test | 450 mL Coolant J 50/50 pre-diluted product + 4.5 g 10% NaNO$_2$ + 0.2340 g AR900 + 0.2699 g Triton H-66 => Exp. 24 test solution | 14 cubes (39.4 g) cut from a New radiator A, B-type, 2 wks @ 100° C.; 425 mL coolant solution used in the test; 16-oz. soda-Lime Glass bottle |
| pH, As Is | 8.7 | 7.7 | 8.7 | 7.8 | 8.2 | 7.9 | 8 | 8.2 |
| EG, vol. % | 50.9 | 51.7 | 51.5 | 52.1 | 51.5 | 52.4 | 56.7 | 59.2 |
| Nitrate, mg/L | 23 | 112 | ND | 88 | 204 | 236 | 177 | 231 |
| Nitrite, mg/L | 612 | 541 | 579 | 541 | 194 | 174 | 535 | 488 |
| % NO$_2$ reduction - included the effect of concentration change | | 12.97% | | 7.64% | | 11.85% | | 12.64% |
| % NO$_2$ Reduction - No concentration change correction | | 11.60% | | 6.56% | | 10.31% | | 8.79% |

TABLE 17

Radiator Cube Leaching Test Results for Examples 25-28.

| | Example | | | | | | | |
|---|---|---|---|---|---|---|---|---|
| | 25 | | 26 | | 27 | | 28 | |
| Solution Volume per gram of radiator cube, mL/g | 9.69 | | 9.73 | | 9.69 | | 15.20 | |
| Test Coolant Solution | 50 vol. % [Coolant A + 0.0514 wt. % Butyl Acid Phosphate] | | 50 vol. % [Coolant A + 0.0514 wt. % Isooctyl Acid Phosphate] | | 50 vol. % [Coolant A + 0.0516 wt. % Isooctyl Acid Phosphate] | | 50 vol. % [Coolant A + 0.1009 wt. % Ethyl Hexyl Acid Phosphate] | |
| Test Conditions | 278.2 g Coolant A concentrate + 250 mL DI H$_2$O + 0.1432 g Butyl Acid Phosphate => Exp. 25 test solution | 16 cubes (49.0 g) New radiator A (cut to 1" × 1" cubes), B-type, 2 wks @ 100° C.; 475 mL coolant solution used in the | 276.5 g Coolant A concentrate + 250 mL DI H$_2$O + 0.1423 g isooctyl Acid Phosphate => Exp. 26 test solution | 16 cubes (48.8 g) New radiator A (cut to 1" × 1" cubes), B-type, 2 wks @ 100° C.; 475 mL coolant solution used in the test. 500-mL | 277.5 g Coolant A concentrate + 250 mL DI H$_2$O + 0.1432 g Ethyl Hexyl Acid Phosphate => Exp. 27 test solution | 16 cubes (49.0 g) New radiator A (cut to 1" × 1" cubes), B-type, 2 wks @ 100° C.; 475 mL coolant solution used in the test. 500- | 1000 mL 50 vol. % Coolant A (50/50 pre-dilute coolant A) + 0.5607 g Ethyl hexyl Acid phosphate => Exp. 28 test solution | 21 cubes (62.5 g) cut from a New radiator A, B-type, 2 wks @ 100° C.; 950 mL coolant solution used in the test |

TABLE 17-continued

Radiator Cube Leaching Test Results for Examples 25-28.

| | Example | | | | | | | |
|---|---|---|---|---|---|---|---|---|
| | 25 | | 26 | | 27 | | 28 | |
| | | test. 500-mL PP bottle | | PP bottle | | mL PP bottle | | |
| pH, As Is | 8.3 | 7.6 | 8.4 | 7.4 | 8.5 | 7.4 | 8.4 | 7.7 |
| EG, vol. % | 52.2 | 53 | 50.9 | 51.5 | 51.5 | 52.1 | 53.6 | 54.4 |
| Nitrate, mg/L | ND | 191 | nd | 192 | ND | 205 | 30 | 170 |
| Nitrite, mg/L | 689 | 541 | 686 | 543 | 707 | 534 | 673 | 522 |
| % $NO_2$ reduction - included the effect of concentration change | | 22.67% | | 21.77% | | 25.34% | | 23.58% |
| % $NO_2$ Reduction - No concentration change correction | | 21.48% | | 20.85% | | 24.47% | | 22.44% |

TABLE 18

Radiator Cube Leaching Test Results for Examples 29-30.

| | Example | | | |
|---|---|---|---|---|
| | 29 | | 30 | |
| Solution Volume per gram of radiator cube, mL/g | 10.87 | | 10.29 | |
| Test Coolant Solution | 50 vol. % [Coolant A + 0.20 wt. % Isooctyl Acid Phosphate] | | 50 vol. % [Coolant C + 0.09 wt. % AR900 + 0.20 wt. % Butyl Acid Phosphate] | |
| Test Conditions | 500 mL Coolant A 50/50 pre-dilute + 0.5 g Isooctyl acid phosphate => Exp. 29 test solution | 14 cubes (39.1 g) cut from a New radiator A, B-type, 2 wks @ 100° C.; 425 mL coolant solution used in the test; 16-oz. soda-Lime Glass bottle | 225 mL/ 249.6 g Coolant C concentrate + 250 mL DI $H_2O$ + 0.5 g Butyl acid Phosphate => Exp. 30 test solution | 14 cubes (41.3 g) cut from a New Ford fusion radiator, B-type, #BE5Z-8005-F, 2 wks @ 100° C.; 425 mL coolant solution used in the test; 16-oz. soda-Lime Glass bottle |
| pH, As Is | 7.9 | 7.8 | 7.4 | 7.2 |
| EG, vol. % | 53.5 | 55.8 | 51.3 | 53.8 |
| Nitrate, mg/L | ND | 83 | ND | 128 |
| Nitrite, mg/L | 696 | 561 | 601 | 533 |
| % $NO_2$ reduction - included the effect of concentration change | | 22.72% | | 15.44% |
| % $NO_2$ Reduction - No concentration change correction | | 19.40% | | 11.31% |

TABLE 19

ASTM D4340 Test Results

| ID | Coolant Tested | D4340 Corrosion Rate, mg/cm²/wk |
|---|---|---|
| Comparative Example 13 | Coolant A + 0.05 wt. % HEDP Na salt | 4.67 |
| Comparative Example 14 | Coolant G + 0.2 wt. % HEDP Na salt | 6.96 |
| Comparative Example 15 | Coolant B + 0.038 wt. % $Na_2MoO_4$, 41.1% + 0.05 wt. % HEDP Na salt | 3.98 |
| Comparative Example 16 | Coolant H + 0.025 wt. % HEDP Na salt | 2.87 |
| Comparative Example 17 | Coolant A + 0.1 wt. % $CaAc_2*H_2O$ + 0.022 wt. % $MgAc_2*4H_2O$ + 0.1 wt. % HEDP Na salt | 1.20 |
| Comparative Example 18 | Coolant A + 0.05 wt. % $CaAc_2*H_2O$ + 0.022 wt. % $MgAc_2*4H_2O$ + 0.1 wt. % HEDP Na salt | 3.92 |
| Comparative Example 19 | Coolant A + 0.01 wt. % $CaAc_2*H_2O$ + 0.022 wt. % $MgAc_2*4H_2O$ + 0.025 wt. % HEDP Na salt | 2.87 |
| Comparative Example 20 | Coolant A + 0.005 wt. % $Sr(OH)_2*8H_2O$ + 0.022 wt. % $MgAc_2*4H_2O$ + 0.025 wt. % HEDP Na salt | 2.55 |
| Comparative Example 21 | Coolant A + 0.005 wt. % $Sr(OH)_2*8H_2O$ + 0.025 wt. % HEDP Na salt | 2.65 |
| Comparative Example 22 | Coolant G + 0.025 wt. % HEDP Na salt | 1.95 |
| Example 31 | Coolant B + 0.039 wt. % $Na_2MoO_4$, 41.1% + 0.05 wt. % Triton H-66 | 0.43 |
| Example 32 | Coolant N + 0.1 wt. % Triton H-66 | 0.60 |
| Example 33 | Coolant H + 0.05 wt. % Triton H-66 | 0.89 |
| Example 34 | Coolant H + 0.1 wt. % Triton H-66 | 1.06 |
| Example 35 | Coolant G + 0.01 wt. % $CaAc_2*H_2O$ + 0.022 wt. % $MgAc_2*4H_2O$ + 0.1 wt. % Triton H-66 | 0.12 |
| Example 36 | Coolant G + 0.01 wt. % $CaAc_2*H_2O$ + 0.022 wt. % $MgAc_2*4H_2O$ + 0.2 wt. % Triton H-66 | 0.14 |
| Example 37 | Coolant A + 0.1 wt. % $CaAc_2*H_2O$ + 0.022 wt. % $MgAc_2*4H_2O$ + 0.1 wt. % Triton H-66 | 0.30 |
| Example 38 | Coolant A + 0.05 wt. % $CaAc_2*H_2O$ + 0.022 wt. % $MgAc_2*4H_2O$ + 0.1 wt. % Triton H-66 | 0.21 |
| Example 39 | Coolant A + 0.01 wt. % $CaAc_2*H_2O$ + 0.022 wt. % $MgAc_2*4H_2O$ + 0.1 wt. % Triton H-66 | 0.09 |
| Example 40 | Coolant H + 0.005 wt. % $CaAc_2*H_2O$ + 0.022 wt. % $MgAc_2*4H_2O$ + 0.1 wt. % Chemfac NF-100 | −0.01 |
| Example 41 | Coolant H + 0.005 wt. % $CaAc_2*H_2O$ + 0.022 wt. % $MgAc_2*4H_2O$ + 0.2 wt. % Chemfac NF-100 | 0.02 |
| Example 42 | Coolant G + 0.01 wt. % $CaAc_2*H_2O$ + 0.022 wt. % $MgAc_2*4H_2O$ + 0.1 wt. % Chemfac NF-100 | 0.00 |
| Example 43 | Coolant G + 0.01 wt. % $CaAc_2*H_2O$ + 0.022 wt. % $MgAc_2*4H_2O$ + 0.2 wt. % Chemfac NF-100 | 0.00 |
| Example 44 | Coolant A + 0.1 wt. % $CaAc_2*H_2O$ + 0.022 wt. % $MgAc_2*4H_2O$ + 0.1 wt. % Chemfac NF-100 | 0.06 |
| Example 45 | Coolant G + 0.01 wt. % $CaAc_2*H_2O$ + 0.022 wt. % $MgAc_2*4H_2O$ + 0.05 wt. % Triton H-66 + 0.05 wt. % Chemfac NF-100 | 0.05 |
| Example 46 | Coolant H + 0.005 wt. % $CaAc_2*H_2O$ + 0.022 wt. % $MgAc_2*4H_2O$ + 0.05 wt. % Triton H-66 + 0.05 wt. % Chemfac NF-100 | 0.01 |
| Example 47 | Coolant P | −0.04 |
| Example 48 | Coolant Q | 0.12 |
| Example 49 | Coolant C + 0.2 wt. % Isooctyl acid phosphate | 0.82 |
| Example 50 | Coolant A + 0.1 wt. % $CaAc_2*H_2O$ + 0.022 wt. % $MgAc_2*4H_2O$ + 0.1 wt. % Isooctyl acid phosphate | 0.44 |
| Example 51 | Coolant A + 0.005 wt. % $Sr(OH)_2*8H_2O$ + 0.022 wt. % $MgAc_2*4H_2O$ + 0.1 wt. % Triton H-66 | 0.07 |

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a freezing point depressant," "an organophosphate," "a carboxylic acid or a salt thereof," "a component," etc.) does not exclude the presence, in some embodiments, of a plurality of such elements.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A heat transfer fluid concentrate comprising:
 a freezing point depressant, water, or a combination thereof;
 an organophosphate selected from the group consisting of ethylene glycol phosphate, 1,2,3-propanetriol phosphate, a $C_6$ to $C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, polyethylene glycol mono(octylphenyl) ether phosphate, an aryl acid phosphate, alkali metal salts of an alkylphenoxypolyethoxyethyl phosphoric acid, and combinations thereof;
 a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof;
 an alkaline earth metal ion selected from the group consisting of magnesium, calcium, strontium, and a combination thereof;
 a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof; and a component selected from the group consisting of an alkali metal ion, a transition metal ion, an inorganic phosphate, molybdate ion, nitrate ion, nitrite ion, an azole compound, a copper and copper alloy corrosion inhibitor, and combinations thereof;

wherein the heat transfer fluid concentrate is free of silicate.

2. The heat transfer fluid concentrate of claim 1 further comprising an additional component selected from the group consisting of a phosphonate, a phosphinate, a colorant, a biocide, an antifoam, a surfactant, a dispersant, an antiscalant, a wetting agent, an additional corrosion inhibitor, and combinations thereof.

3. The heat transfer fluid concentrate of claim 1 wherein the freezing point depressant comprises an alcohol.

4. The heat transfer fluid concentrate of claim 3 wherein the alcohol is selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, methoxyethanol, and combinations thereof.

5. The heat transfer fluid concentrate of claim 1 wherein the water is deionized water, demineralized water, softened water, or a combination thereof.

6. The heat transfer fluid concentrate of claim 1 wherein the alkaline earth metal ion is derived from a water-soluble alkaline earth metal salt, an alkaline earth metal compound, or a combination thereof.

7. The heat transfer fluid concentrate of claim 1 wherein the alkaline earth metal ion is derived from an alkaline earth metal oxide.

8. The heat transfer fluid concentrate of claim 1 wherein the alkali metal ion is derived from a water-soluble alkali metal salt, an alkali metal compound, or a combination thereof.

9. The heat transfer fluid concentrate of claim 1 wherein the alkali metal ion is derived from an alkali metal oxide.

10. The heat transfer fluid concentrate of claim 1 wherein the transition metal ion is zinc.

11. The heat transfer fluid concentrate of claim 1 wherein the transition metal ion is derived from a water-soluble transition metal salt, a transition metal compound, or a combination thereof.

12. The heat transfer fluid concentrate of claim 1 wherein the transition metal ion is derived from a transition metal oxide.

13. The heat transfer fluid concentrate of claim 12 wherein the transition metal oxide is zinc oxide.

14. The heat transfer fluid concentrate of claim 1 wherein the inorganic phosphate comprises a phosphorous oxoacid.

15. The heat transfer fluid concentrate of claim 14 wherein the phosphorous oxoacid is selected from the group consisting of phosphoric acid, sodium orthophosphate, potassium orthophosphate, and combinations thereof.

16. The heat transfer fluid concentrate of claim 1 wherein the azole compound is selected from the group consisting of benzotriazole, tolyltriazole, 4-methyl benzotriazole, 5-methyl benzotriazole, 1-butyl-1H-benzotriazole, mercaptobenzothiazole, thiazole, substituted thiazoles, imidazole, benzimidazole, substituted imidazoles, indazole, substituted indazoles, tetrazole, substituted tetrazoles, tetrahydrobenzotriazoles, tetrahydrogenated benzotriazoles, tetrahydrotolyltriazole, 4-methyl-1H-benzotriazole, 5-methyl-1H-benzotriazole, tetrahydrobenzotriazole, alkali metal salts thereof, and combinations thereof.

17. The heat transfer fluid concentrate of claim 1 wherein the molybdate ion is derived from an alkali metal molybdate, an alkaline earth metal molybdate, or a combination thereof.

18. The heat transfer fluid of claim 1 wherein a pH of the heat transfer fluid concentrate at 50% concentration is between about 6.8 and about 10.0.

19. A ready-to-use heat transfer fluid comprising the heat transfer fluid concentrate of claim 1 and water, wherein the heat transfer fluid concentrate is present in an amount ranging from about 40 vol % to about 60 vol % based on a total volume of the ready-to-use heat transfer fluid.

20. A heat transfer fluid concentrate comprising:

a freezing point depressant, water, or a combination thereof;

an organophosphate selected from the group consisting of ethylene glycol phosphate, 1,2,3-propanetriol phosphate, a $C_6$ to $C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, polyethylene glycol mono(octylphenyl) ether phosphate, an aryl acid phosphate, alkali metal salts of an alkylphenoxypolyethoxyethyl phosphoric acid, and combinations thereof;

a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof;

an alkaline earth metal ion selected from the group consisting of magnesium, calcium, strontium, and a combination thereof;

a water soluble polymer is selected from an acrylate/acrylamide copolymer, a polymethacrylate, a polymaleic acid, a maleic anhydride-based polymer, a maleic acid-based polymer, a maleic acid-based copolymer, a maleic acid based-terpolymer, a modified acrylamide-based polymer, an acrylamide-based copolymer, an acrylamide-based terpolymer, and combinations thereof; and a component selected from the group consisting of an alkali metal ion, a transition metal ion, an inorganic phosphate, molybdate ion, nitrate ion, nitrite ion, an azole compound, a copper and copper alloy corrosion inhibitor, and combinations thereof;

wherein the heat transfer fluid concentrate is free of silicate.

21. A heat transfer fluid concentrate comprising:

a freezing point depressant or a combination of the freezing point depressant and water, wherein the freezing point depressant comprises from about 1 wt % to about 99% wt % based on a total weight of the heat transfer fluid concentrate;

an organophosphate selected from the group consisting of ethylene glycol phosphate, 1,2,3-propanetriol phosphate, a $C_6$ to $C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, polyethylene glycol mono(octylphenyl) ether phosphate, an aryl acid phosphate, alkali metal salts of an alkylphenoxypolyethoxyethyl phosphoric acid, and combinations thereof, wherein the organophosphate comprises from about 0.002 wt % to about 5 wt % based on the total weight of the heat transfer fluid concentrate;
a carboxylic acid or a salt thereof, wherein the carboxylic acid or the salt thereof comprises from about 1 wt % to about 10 wt % based on the total weight of the heat transfer fluid concentrate, wherein the carboxylic acid comprises one or a plurality of $C_6$ to $C_{20}$ carboxylic acids, and wherein the one or the plurality of $C_6$ to $C_{20}$ carboxylic acids is individually selected from the group consisting of an aliphatic mono-carboxylic acid, an aliphatic di-carboxylic acid, an aromatic mono-carboxylic acid, an aromatic di-carboxylic acid, and combinations thereof;
calcium ion in a concentration up to about 200 mg/L based on a total weight of the heat transfer fluid concentrate;
magnesium ion in a concentration up to about 150 mg/L based on a total weight of the heat transfer fluid concentrate;
an azole compound comprising from about 0.01 wt % to about 3 wt % based on the total weight of the heat transfer fluid concentrate;
a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof;
an additional component selected from an inorganic phosphate, lithium ion, zinc ion, nitrate ion, nitrite ion, and molybdate ion; and
optionally, an additional component selected from the group consisting of a phosphonate, a phosphinate, a colorant, a biocide, an antifoam, a surfactant, a dispersant, an antiscalant, a wetting agent, and combinations thereof
wherein the heat transfer fluid concentrate is free of silicate.

22. The heat transfer fluid concentrate of claim 21 wherein the freezing point depressant is selected from the group consisting of ethylene glycol, 1,2-propylene glycol, 1,3-propylene glycol, glycerol, and combinations thereof.

23. A method of preventing corrosion in a heat transfer system, the method comprising:
contacting at least a portion of the heat transfer system with a ready-to-use heat transfer fluid;
wherein the ready-to-use heat transfer fluid comprises:
a freezing point depressant, water, or a combination thereof;
an organophosphate selected from the group consisting of ethylene glycol phosphate, 1,2,3-propanetriol phosphate, a $C_6$ to $C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, polyethylene glycol mono(octylphenyl) ether phosphate, an aryl acid phosphate, alkali metal salts of an alkylphenoxypolyethoxyethyl phosphoric acid, and combinations thereof;
a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof;
an alkaline earth metal ion selected from the group consisting of magnesium, calcium, strontium, and a combination thereof;
a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof; and
a component selected from the group consisting of an alkali metal ion, a transition metal ion, an inorganic phosphate, molybdate ion, nitrate ion, nitrite ion, an azole compound, a copper and copper alloy corrosion inhibitor, and combinations thereof;
wherein the heat transfer fluid concentrate is free of silicate.

24. The method of claim 23 wherein the ready-to-use heat transfer fluid further comprises an azole compound, wherein the alkaline earth metal ion comprises calcium and magnesium ions, and wherein the polycarboxylate comprises an acrylate-based polymer.

25. The method of claim 23 wherein the portion of the heat transfer system comprises a component made by controlled atmosphere brazing.

26. A heat transfer fluid concentrate prepared by a process comprising combining
(a) a freezing point depressant,
(b) water,
(c) an organophosphate selected from the group consisting of ethylene glycol phosphate, 1,2,3-propanetriol phosphate, a $C_6$ to $C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, polyethylene glycol mono (octylphenyl) ether phosphate, an aryl acid phosphate, alkali metal salts of an alkylphenoxypolyethoxyethyl phosphoric acid, and combinations thereof,
(d) a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof,
(e) a water-soluble alkaline earth metal salt, an alkaline earth metal compound, an alkaline earth metal oxide, or a combination thereof, wherein the alkaline earth metal is selected from the group consisting of magnesium, calcium, strontium, and a combination thereof;
(f) a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof, and
(g) a component selected from the group consisting of a water-soluble zinc salt, a zinc compound, a zinc oxide, a water-soluble inorganic phosphate, a nitrate, a nitrite, a molybdate, an azole compound, a copper and copper alloy corrosion inhibitor, and combinations thereof;
wherein the heat transfer fluid concentrate is free of silicate.

27. The heat transfer fluid concentrate of claim 26 wherein a pH of the heat transfer fluid concentrate at 50% concentration is between about 6.8 and about 10.0.

28. A heat transfer fluid concentrate comprising:
- a freezing point depressant, water, or a combination thereof;
- an organophosphate selected from the group consisting of an ethylene glycol phosphate, 1,2,3-propanetriol phosphate, potassium cresyl phosphate, a $C_6$-$C_{12}$ alkyl alcohol ethoxylate phosphoric acid, an alkali metal salt of a phosphate ester of cresyl ethoxylate, an alkali metal salt of an aromatic ethoxylate phosphate ester, an ethoxylated fatty alcohol phosphate ester, an alkali metal salt of an ethoxylated alkylphenol phosphate, an aryl acid phosphate, an alcohol phosphate ester, a phosphated alcohol, a phosphated alcohol ethoxylate, a phosphated phenol ethoxylate, and a combination thereof;
- a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof;
- an alkaline earth metal ion selected from the group consisting of magnesium, calcium, strontium, and a combination thereof;
- a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof; and
- a component selected from the group consisting of an alkali metal ion, a transition metal ion, an inorganic phosphate, molybdate ion, nitrate ion, nitrite ion, an azole compound, a copper and copper alloy corrosion inhibitor, and combinations thereof;
- wherein the heat transfer fluid concentrate is free of silicate.

29. The heat transfer fluid concentrate of claim 28 wherein the carboxylic acid is 2-ethyl hexanoic acid, neodecanoic acid, or a combination thereof.

30. A heat transfer fluid concentrate prepared by a process comprising, combining
- a freezing point depressant, water, or a combination thereof;
- an organophosphate selected from the group consisting of (i) an ethylene glycol phosphate, 1,2,3-propanetriol phosphate, potassium cresyl phosphate, a $C_6$-$C_{12}$ alkyl alcohol ethoxylate phosphoric acid, an alkali metal salt of a phosphate ester of cresyl ethoxylate, an alkali metal salt of an aromatic ethoxylate phosphate ester, an ethoxylated fatty alcohol phosphate ester, an alkali metal salt of an ethoxylated alkylphenol phosphate, an alcohol phosphate ester, a phosphated alcohol, a phosphated alcohol ethoxylate, a phosphated phenol ethoxylate, and a combination thereof, (ii) an alkyl or aryl acid phosphate selected from the group consisting of isooctyl acid phosphate, 2-ethylhexyl acid phosphate, amyl acid phosphate, amyl dihydrogen phosphate, diamyl hydrogen phosphate, butyl acid phosphate, methyl acid phosphate, phenyl acid phosphate, dimethyl acid phosphate, isooctyl acid phosphate, and combinations thereof, and a combination of (i) and (ii);
- a carboxylic acid or a salt thereof, wherein the carboxylic acid is selected from the group consisting of 2-ethyl hexanoic acid, heptonic acid, octanoic acid, adipic acid, decanoic acid, neodecanoic acid, sebacic acid, benzoic acid, p-toluic acid, t-butyl benzoic acid, an alkoxybenzoic acid, and combinations thereof;
- an alkaline earth metal ion selected from the group consisting of magnesium, calcium, strontium, and a combination thereof;
- a water-soluble polymer, wherein the water-soluble polymer is a polycarboxylate, and wherein the polycarboxylate is an acrylate-based polymer, an acrylate-based copolymer, an acrylate-based terpolymer, an acrylate-based quadpolymer, or a combination thereof; and
- a component selected from the group consisting of an alkali metal ion, a transition metal ion, an inorganic phosphate, molybdate ion, nitrate ion, nitrite ion, an azole compound, a copper and copper alloy corrosion inhibitor, and combinations thereof;
- wherein the heat transfer fluid concentrate is free of silicate.

* * * * *